United States Patent
Ohashi et al.

(10) Patent No.: US 6,225,934 B1
(45) Date of Patent: May 1, 2001

(54) IMAGE READING APPARATUS FOR REDUCING COLOR DIFFERENCES

(75) Inventors: Kazuhito Ohashi, Shizuoka-ken; Noriyoshi Chizawa, Mishima; Masafumi Kamei, Numazu; Takashi Sugiura, Mishima, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/122,445

(22) Filed: Jul. 24, 1998

(30) Foreign Application Priority Data

Jul. 31, 1997 (JP) .................................................. 9-219043

(51) Int. Cl.[7] .................................................. H03M 1/12
(52) U.S. Cl. ........................................... 341/155; 358/461
(58) Field of Search ........................... 341/155; 348/294; 358/461

(56) References Cited

U.S. PATENT DOCUMENTS

| | | | |
|---|---|---|---|
| 5,132,788 | 7/1992 | Hirota | 358/75 |
| 5,289,296 | 2/1994 | Yamada | 358/530 |
| 5,357,353 | * 10/1994 | Hirota | 358/530 |
| 5,489,989 | 2/1996 | Shimizu et al. | 358/401 |
| 5,513,018 | * 4/1996 | Nisimura | 358/474 |
| 5,623,301 | * 4/1997 | Okimoto et al. | 347/251 |
| 5,625,718 | * 4/1997 | Kaji et al. | 382/274 |
| 5,917,620 | * 6/1999 | Hasegawa et al. | 358/513 |
| 5,929,417 | * 7/1999 | Hayashi et al. | 235/454 |
| 5,956,087 | * 9/1999 | Takayama et al. | 348/275 |

OTHER PUBLICATIONS

Kinoshita Hidehiko, Abstract of Japanese patent application entitled, "Image Forming Device", Publication No. 08–293973, Published Nov., 1996.

Yoshitani Akihiro, Abstract of Japanese patent application entitled, "Image Processing Unit", Publication No. 09–307762, Published Nov., 1997.

* cited by examiner

*Primary Examiner*—Peguy JeanPierre
(74) *Attorney, Agent, or Firm*—Fitzpatrick, Cella, Harper & Scinto

(57) ABSTRACT

This invention provides an image reading method and apparatus which can prevent a large difference from being produced between the color tones of the read image and the original image. A plurality of signals output from an image sensor (101) are A/D-converted into a plurality of digital signals by A/D conversion circuits (105), a predetermined one of the A/D-converted digital signals is compared with a predetermined reference level by a comparator (108), a low-pass filter (109) removes any high-frequency component from the comparison result, and the output from the low-pass filter (109) is controlled to be input to the A/D conversion circuits (105) as a reference voltage for determining the input range of each A/D conversion circuit (105).

18 Claims, 18 Drawing Sheets

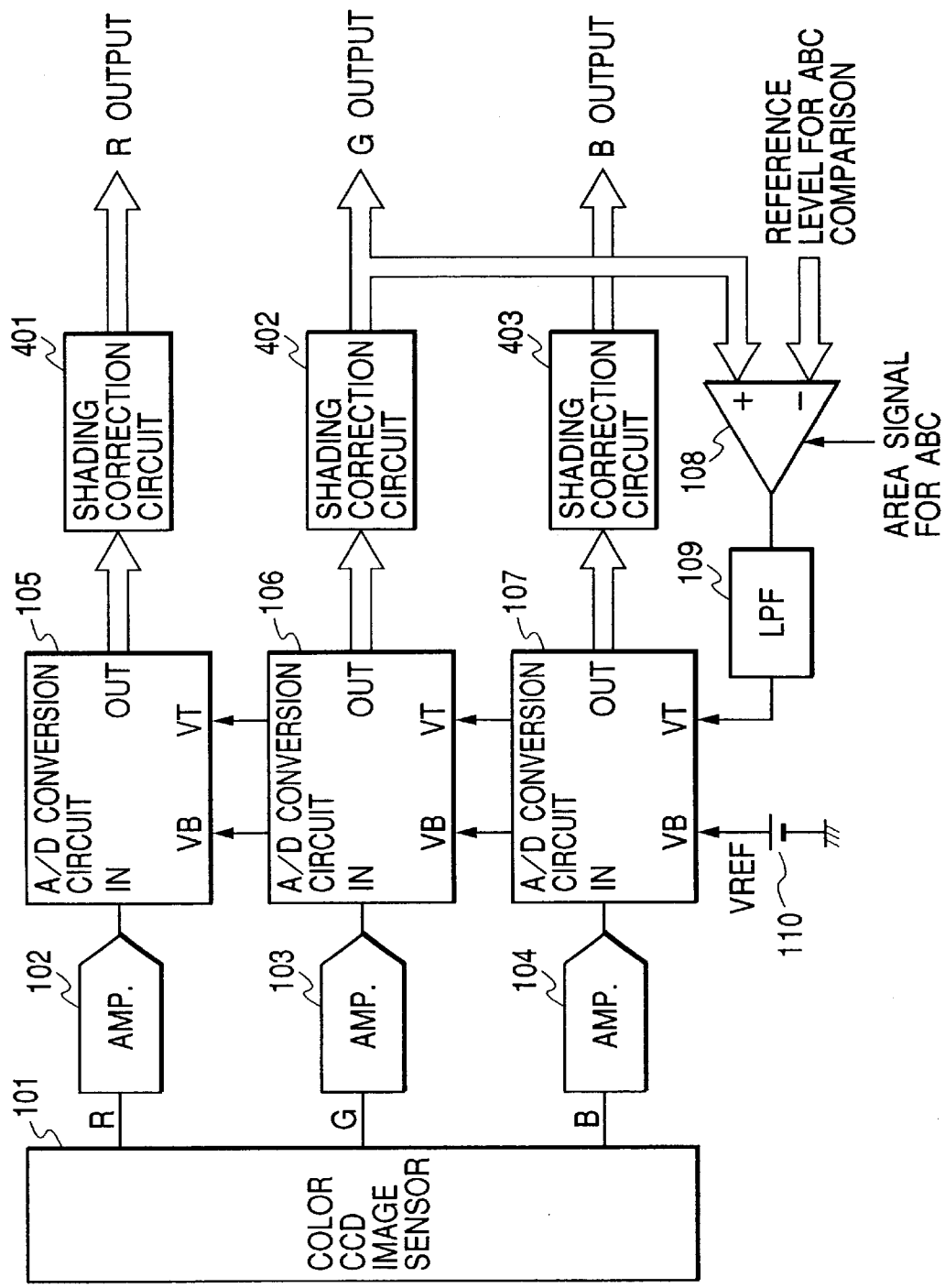

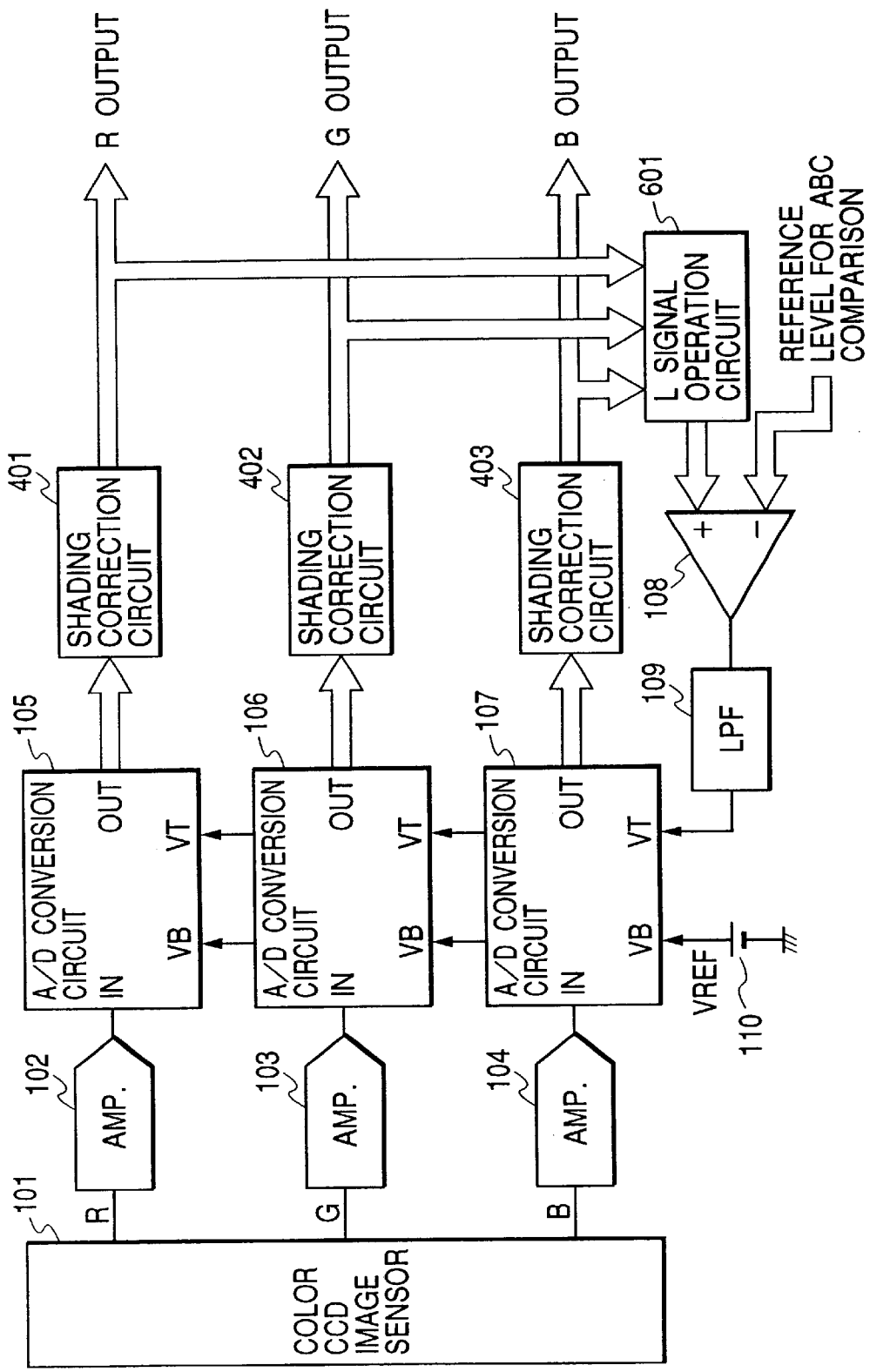

IMAGE READING APPARATUS FOR REDUCING COLOR DIFFERENCES

BACKGROUND OF THE INVENTION

1. Field of the Invention

The present invention relates to an image reading apparatus for reading an original image using an image sensor.

2. Related Background Art

As conventional image reading apparatuses for reading an original image using a linear CCD (charge coupled device) image sensor, an apparatus which has an ABC (Auto Background Control) circuit for automatically varying the read signal in correspondence with the brightness of an original, is known.

FIG. 17 shows an example of the arrangement of the conventional image reading apparatus with such ABC circuit (to be referred to as a first conventional apparatus hereinafter). In FIG. 17, a B/W (black/white) CCD image sensor 1801 converts an optical signal coming from an optical system (not shown) into an electrical signal, and outputs it as an image signal. An amplifier 1802 amplifies the output from the CCD image sensor 1801 to a predetermined level. An A (analog)/D (digital) conversion circuit 1803 converts the output from the amplifier 1802 into a digital signal. A comparator 1804 compares the digital image signal output from the A/D conversion circuit 1803 with a predetermined reference level for ABC comparison. An LPF (low-pass filter) 1805 removes (cuts) components in the high-frequency range (high-frequency components) of the output signal from the comparator 1804. A reference voltage source 1806 generates a reference voltage VREF to be input to VB (bottom reference) of VT (top reference) and VB (bottom reference), which determine the input range of the A/D conversion circuit 1803.

In FIG. 17, the output signal from the comparator 1804, from which high-frequency components have been cut by the LPF 1805, is input to the VT (top reference) terminal of the A/D conversion circuit 1803. For this reason, when the signal level of the digital image signal output from the A/D conversion circuit 1803 is larger than the reference level for ABC comparison, the VT (top reference) of the A/D conversion circuit 1803 is controlled to increase, and consequently, the signal level of the digital image signal output from the A/D conversion circuit 1803 decreases. By contrast, when the signal level of the digital image signal becomes smaller than the reference level for ABC comparison, the VT (top reference) of the A/D conversion circuit 1803 is controlled to decrease, and as a result, the signal level of the digital image signal output from the A/D conversion circuit 1803 increases.

As a result of the control, the average level of the digital image signal output from the A/D conversion circuit 1803 matches the reference level for ABC comparison.

In FIG. 17, the comparator 1804 receives an area signal for ABC, so that the comparator 1804 outputs a comparison signal in only an image area to be subjected to ABC comparison, but stops its output in an image area (e.g., a non-image period and image edge portions) not to be subjected to ABC comparison.

Hence, in the first conventional apparatus, since the read signal level is controlled so that the average level obtained by reading an original image always matches the reference level for comparison, both dark and light original images can always be read with optimal signal levels.

FIG. 18 shows an example of the arrangement of another image reading apparatus using a linear image sensor (to be referred to as a second conventional apparatus hereinafter). In this second conventional apparatus, an original 1911 on a platen glass 1910 is illuminated using a light source 1909 for illuminating an original, and a reflection member 1908, and an optical original image is formed on the light-receiving surface of a CCD linear image sensor 1901 via first, second, and third mirrors 1907, 1904, and 1905, and a lens 1902. A first moving unit 1906 bounded by the one-dashed chain line in FIG. 18 moves at a speed V in the direction of an arrow A in FIG. 18, and a second moving unit 1903 bounded by the two-dashed chain line moves at a speed V/2 in the direction of an arrow B in FIG. 18 (to be referred to as a subscan hereinafter) at the same time, thus reading the image on the entire original 1911 by the CCD linear image sensor 1901.

FIG. 19 shows an example of the flow of signal processing of an image signal obtained from the CCD linear image sensor 1901 shown in FIG. 18. In FIG. 19, the output signal from the CCD linear image sensor 1901 is amplified by a gain amplifier 2001, and is input to an analog signal processing circuit 2002 to extract an image signal component. The analog image signal is converted by an A (analog)/D (digital) conversion circuit 2003 into a digital image signal. The digital image signal is subjected to shading correction for uniformly reading an original image in a shading correction circuit 2004. After that, the digital image signal is output from an output terminal 2005.

In still another conventional image reading apparatus (to be referred to as a third conventional apparatus hereinafter), since the reading speed of an original image is low like in facsimile apparatuses and the like, a photoelectric conversion element for one line can correspond to a single A/D converter. For this reason, the individual differences (variations in characteristics) of A/D converters upon processing one-line data of an original using different A/D converters need not be taken into consideration.

In recent years, demand has arisen for mounting an ABC circuit on the above-mentioned first conventional apparatus in a color image reading apparatus using a color CCD image sensor.

However, when the arrangement of the ABC circuit is used in the color image reading apparatus, the following problem is posed.

That is, when independent ABC circuits are added for the read signals of the respective colors read by the color image reading apparatus, the reading levels of the respective colors are independently controlled. For this reason, the color tone of the read image has a large difference from that of the original.

In the flow of the signal processing shown in FIG. 19 in the second conventional apparatus, when the original has a color background or a background pattern, and characters are printed thereon, if such original is read by the image reading apparatus, since the level difference between the background and characters is small, the characters may become unclear when the read original image is printed, output to a TV monitor, or output as a facsimile image.

In the third conventional apparatus, when an apparatus with high work efficiency is to be constructed without impairing productivities of the individual functions in a multi-functional image forming apparatus, some of the functions that can operate even at a low reading speed of an original image are required to have a high reading speed of an original image so as to optimize productivities. In an image reading unit, since the photoelectric conversion/transfer speed of the photoelectric conversion element serving as a reading means has an upper limit, photocells which line up in the main scan direction are divided into some groups using their even- and odd-number column positions to attain parallel signal processing, thereby apparently increasing the reading speed. However, when background removal (processing for forcibly recognizing the background as a white background) for an original to be fed and read, the original cannot be read again. Hence, real-time processing is inevitably required, but is impossible to attain in practice.

SUMMARY OF THE INVENTION

It is a first object of the present invention to provide an image reading method and apparatus, which can prevent any large difference from being produced between the color tones of the read image and an original, can reduce variations in ABC control effect among apparatuses due to shading nonuniformity, and can realize ABC control in accordance with not the color tone of an original but its brightness (luminance).

It is a second object of the present invention to provide an image reading method and apparatus, which can clearly output characters and lines when an original image has a color background or a background pattern, and characters are written thereon.

It is a third object of the present invention to provide an image reading method and apparatus, which can obtain the background removal effect of an original and can attain optimal image reading by correcting data offsets traced back to reading means, even when original-fed reading, which disables background removal of an original to be attained by a full scan, is done at, especially, high speed.

In order to achieve the first object, an image reading apparatus according to an embodiment of the present invention, comprises A/D conversion means for converting a plurality of signals output from an image sensor into a plurality of digital signals, comparison means for comparing a predetermined one of the plurality of digital signals A/D-converted by the A/D conversion means with a predetermined reference level, high-frequency component removing means for removing a high-frequency component from a comparison result of the comparison means, and control means for controlling to input the output from the high-frequency component removing means to the A/D conversion means as a reference voltage for determining an input range of the A/D conversion means.

In order to achieve the first object, an image reading apparatus according to another embodiment of the present invention, comprises A/D conversion means for converting a plurality of signals output from an image sensor into a plurality of digital signals, shading correction means for shading-correcting the plurality of digital signals A/D-converted by the A/D conversion means, comparison means for comparing one of the plurality of digital signals shading-corrected by the shading correction means with a predetermined reference level, high-frequency component removing means for removing a high-frequency component from a comparison result of the comparison means, and control means for controlling to input the output from the high-frequency component removing means to the A/D conversion means as a reference voltage for determining an input range of the A/D conversion means.

In order to achieve the first object, an image reading apparatus according to still another embodiment of the present invention, comprises A/D conversion means for converting a plurality of signals output from an image sensor into a plurality of digital signals, shading correction means for shading-correcting the plurality of digital signals A/D-converted by the A/D conversion means, operation means for obtaining one digital signal by performing a predetermined operation for the plurality of digital signals shading-corrected by the shading correction means, comparison means for comparing the operation result of the operation means with a predetermined reference level, high-frequency component removing means for removing a high-frequency component from a comparison result of the comparison means, and control means for controlling to input the output from the high-frequency component removing means to the A/D conversion means as a reference voltage for determining an input range of the A/D conversion means.

With the above arrangement, even when ABC circuits are used in a color image reading apparatus, since the VT values of A/D conversion circuits for R, G, and B channels can be controlled as an identical value, a large difference can be prevented from being produced between the color tones of the read image and an original unlike in a case wherein the R, G, and B channels are independently controlled. Since a signal after shading correction is fed back to the ABC circuit, and the signal to be fed back uses a luminance signal obtained by a predetermined operation using R, G, and B values, variations in ABC control effects among apparatuses depending on shading nonuniformity can be reduced, and ABC control can be realized in accordance with not the color tone of an original but its brightness (luminance).

In order to achieve the second object, an image reading apparatus according to another embodiment of the present invention, comprises A/D conversion means for converting a signal output from an image sensor into a digital signal, shading-correction means for shading-correcting the digital signal A/D-converted by the A/D conversion means, comparison means for comparing the digital signal shading-corrected by the shading correction means with a predetermined reference level, and voltage upper limit value change means for changing an upper limit value of a reference voltage of the A/D conversion means on the basis of a comparison result of the comparison means.

With this arrangement, even when an original to be read has a color background or a background pattern and characters are written on such background, an image with clear characters and lines can be output.

In order to achieve the third object, an image reading apparatus according to still another embodiment of the present invention, comprises reading means for reading an image of an original which passes above original illumination means at a constant speed, and control means for controlling to execute original background removal (for forcibly recognizing the background to be white) in real time.

With this embodiment, the background removal effect of an original can be obtained and optimal image reading can be done by correcting data offsets traced back to reading means, even when original-fed reading, which disables background removal of an original to be attained by a full scan, is done at, especially, high speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a block diagram showing the arrangement of an ABC circuit in an image reading apparatus according to the second embodiment of the present invention;

FIG. 6 is a block diagram showing the arrangement of an ABC circuit in an image reading apparatus according to the third embodiment of the present invention;

DETAILED DESCRIPTION OF THE PREFERRED EMBODIMENTS

The preferred embodiments of the present invention will now be described with reference to FIGS. 1 to 16.

Figure 1:
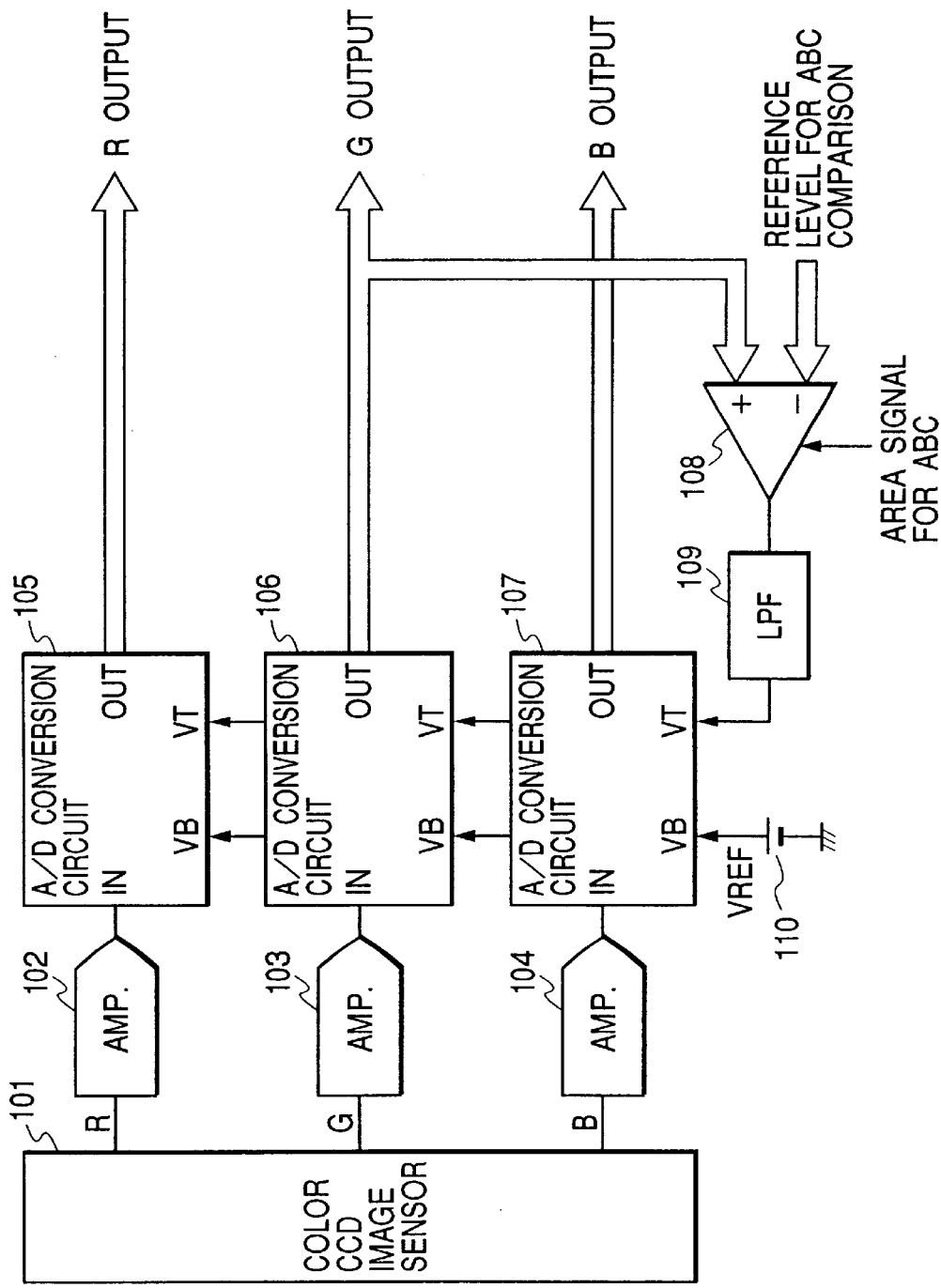
FIG. 1 is a block diagram showing the arrangement of an ABC circuit in an image reading apparatus according to the first embodiment of the present invention.

The first embodiment of the present invention will be described below with reference to FIGS. 1 to 3. FIG. 1 is a block diagram showing the arrangement of an image reading apparatus according to the first embodiment of the present invention. In FIG. 1, a color CCD image sensor 101 converts an optical signal from an optical system into electrical signals and outputs them as image signals. Amplifiers 102, 103, and 104 respectively amplify R (red), G (green), and B (blue) image signals output from the color CCD image sensor 101 to predetermined levels. A/D conversion circuits 105, 106, and 107 convert analog signals output from the amplifiers 102 to 104 into digital signals. A comparator 108 compares a G digital signal output from the A/D conversion circuit 106 for a G signal with a reference level for ABC comparison. An LPF (low-pass filter) 109 removes (cuts) components in the high-frequency range (high-frequency components) of the output signal from the comparator 108. A reference voltage source 110 generates VB (bottom reference) for the A/D conversion circuits 105 to 107.

Note that the VT (top reference) terminals of the A/D conversion circuits 105 to 107 receive the output signal from the LPF 109 in all the channels.

Figure 2:
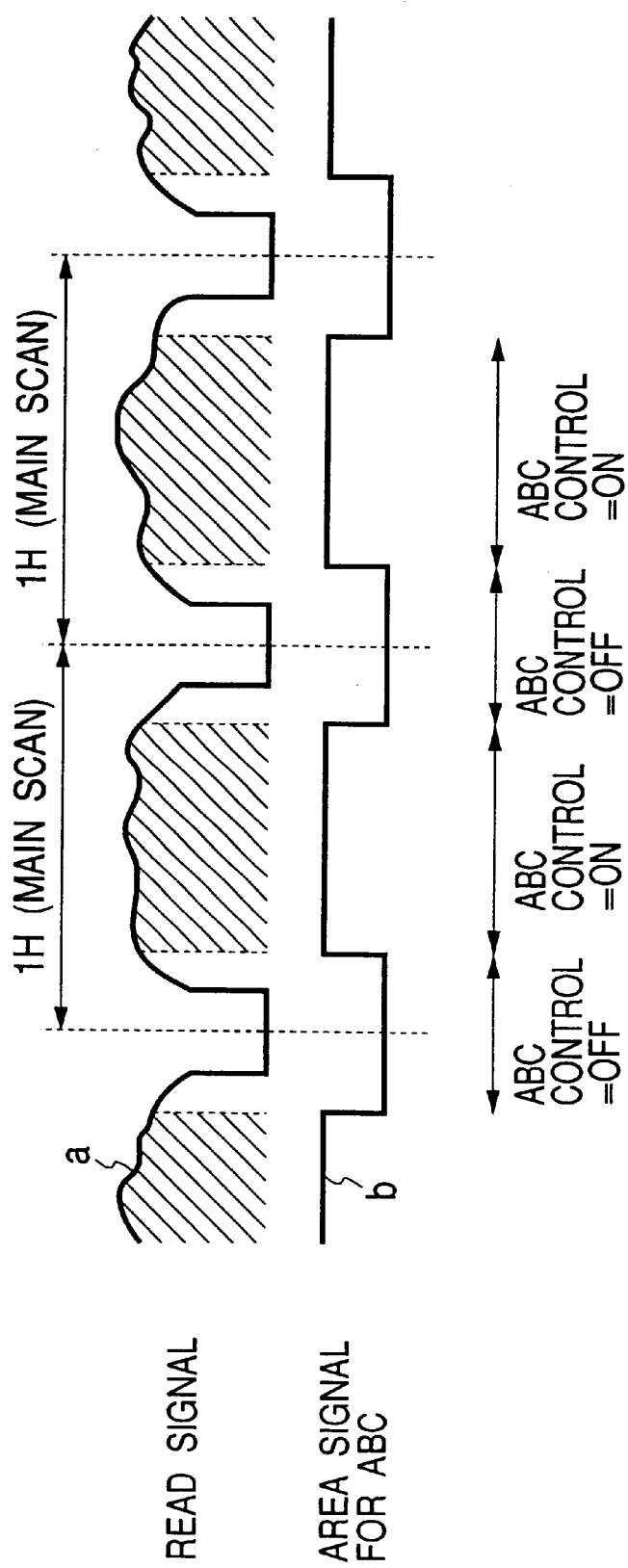
FIG. 2 is a chart showing the control state of an area signal for ABC of the ABC circuit in the image reading apparatus according to the first embodiment of the present invention.

FIG. 2 shows the read signal output from the color CCD image sensor 101 and an area signal for ABC to be input to the comparator 108.

In FIG. 2, a represents the read signal. On the other hand, an area signal b for ABC indicates an image period to be ABC-controlled during the read period for 1H (main scan). The comparator 108 is controlled to operate only during the image period to be ABC-controlled, and to stop its output during a period other than the image period to be ABC-controlled.

Figure 3:
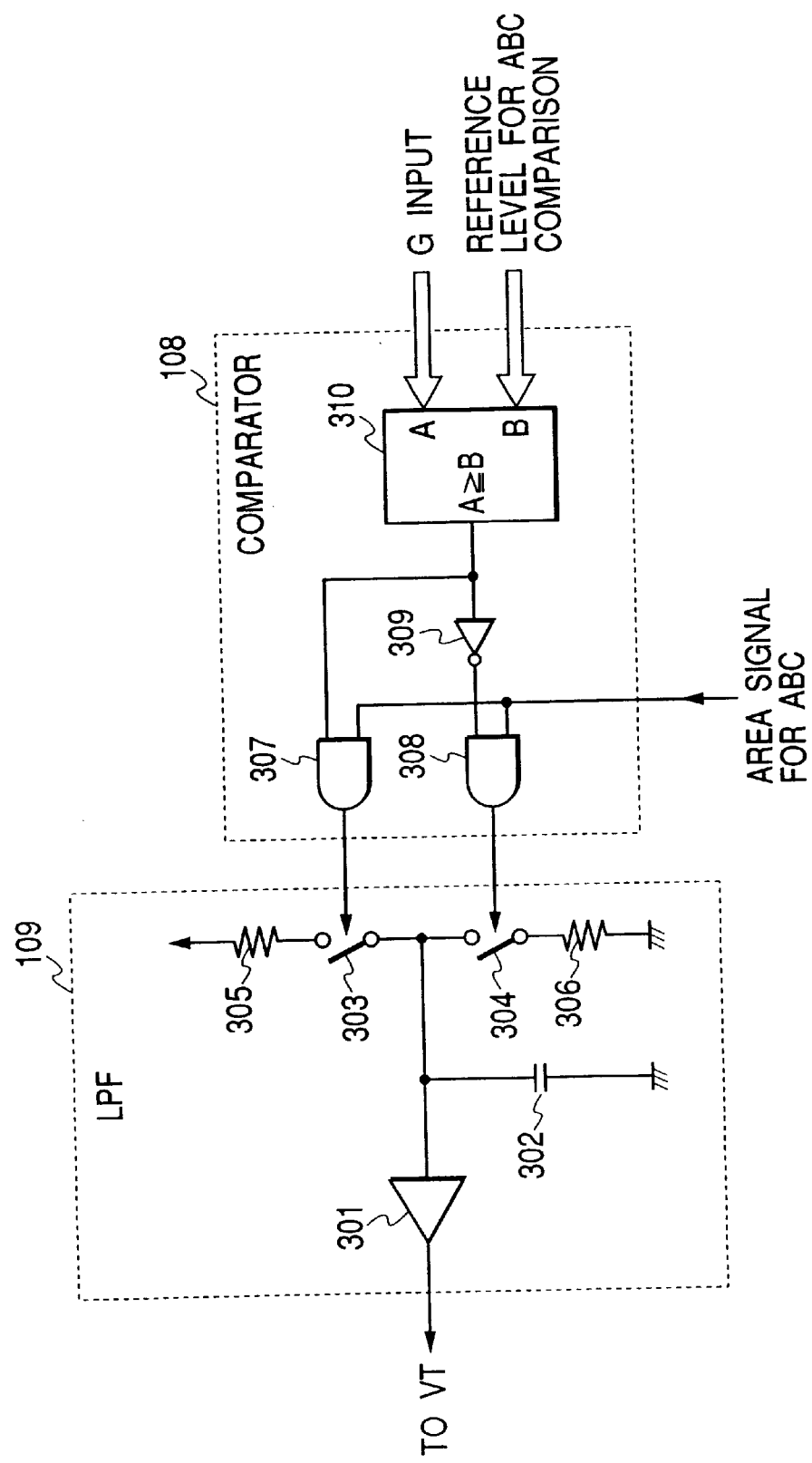
FIG. 3 is a block diagram showing the arrangement of a low-pass filter and comparator in the ABC circuit in the image reading apparatus according to the first embodiment of the present invention.

The comparator 108 and LPF 109 have the arrangement as shown in, e.g., FIG. 3.

In FIG. 3, the comparator 108 is comprised of a comparison circuit 310, two-input AND gates 307 and 308, and an inverter 309. The comparison circuit 310 compares the G input (digital signal) and the reference level for ABC comparison. When G input≧reference level for ABC comparison, the circuit 310 outputs a High-level signal; when G input<reference level for ABC comparison, it outputs a Low-level signal. Only when the area signal for ABC=High, the comparator outputs the comparison result to the LPF 109.

Also, in FIG. 3, the LPF 109 is comprised of analog switches 303 and 304, resistors 305 and 306, a capacitor 302, and a buffer 301. The capacitor 302 is charged/discharged in correspondence with the comparison result from the comparator 108. Note that the voltage of the capacitor 302 is held during a period other than the image period to be ABC-controlled.

With the above-mentioned arrangement of the comparator 108 and LPF 109, the following control is realized:

(1) When G input≧reference level for ABC comparison and when in ABC area, the VT values of the A/D conversion circuits 105 to 107 are controlled to increase.

(2) When G input<reference level for ABC comparison and when in ABC area], the VT values of the A/D conversion circuits 105 to 107 are controlled to decrease.

(3) When other than ABC area, the VT values of the A/D conversion circuits 105 to 107 are controlled to be held.

Since the VT values controlled in such way are input to the top reference values of the A/D conversion circuits 105 to 107 for all the R, G, and B channels, R, G, and B digital signals as the read outputs are subjected to identical gain control. For this reason, the color tone of the read image can be prevented from largely changing with respect to that of the original image, and only the brightness of each read signal level is automatically controlled.

Note that the FIG. 1 shows an example of the arrangement that compares the G output with the reference level for ABC comparison to control the read signal levels. As another example, the B or R output may be compared with the reference level for ABC comparison to control the read signal levels.

Figure 5A:
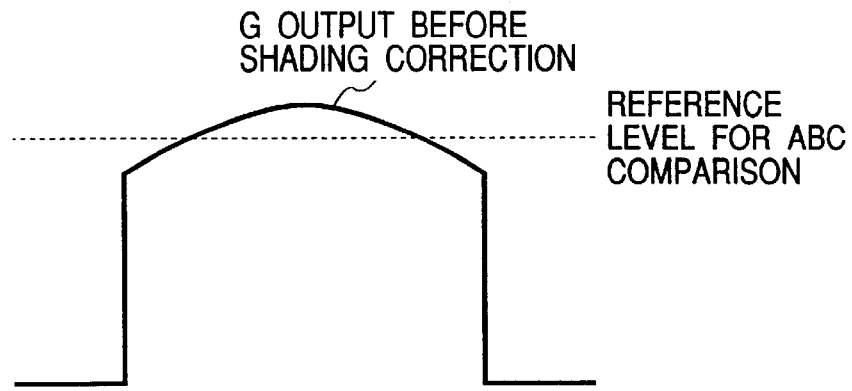
FIGS. 5A, 5B and 5C are charts for explaining the operation of the ABC circuit in the image reading apparatus according to the second embodiment of the present invention.
Figure 5B:
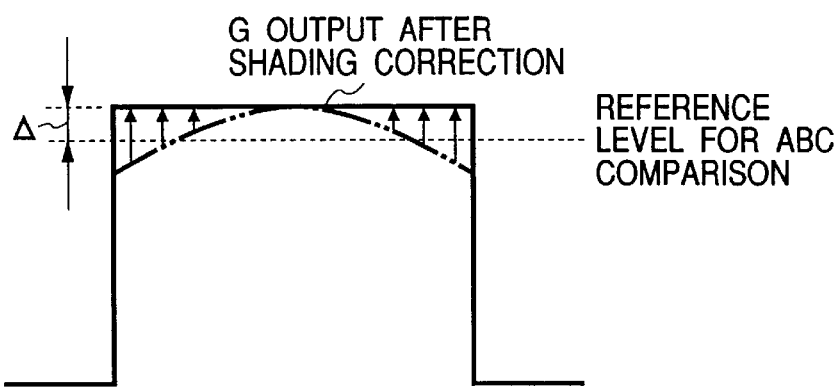
Figure 5C:
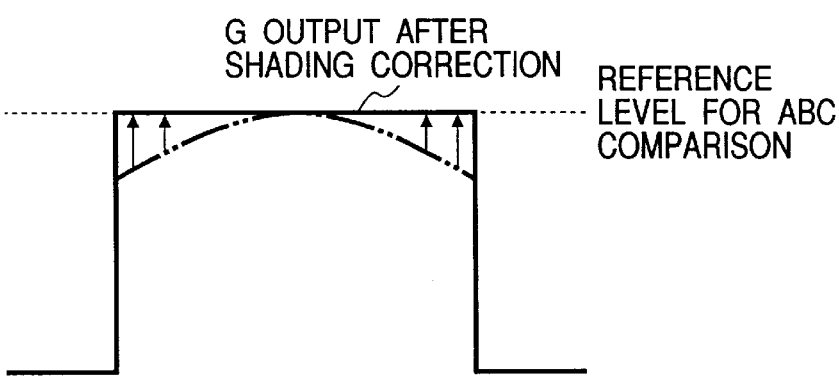

The second embodiment of the present invention will be described below with reference to FIG. 4 and FIGS. 5A to 5C. FIG. 4 is a block diagram showing the arrangement of an image reading apparatus according to the second embodiment of the present invention, and FIGS. 5A to 5C are charts for explaining the operation of an ABC circuit. Note that the same reference numerals in FIG. 4 denote the same parts as those in FIG. 1 in the first embodiment described above.

In FIG. 4, the differences from FIG. 1 are that shading correction circuits 401, 402, and 403 are added to the arrangement shown in FIG. 1, and the G output after shading correction by the shading correction circuit 402 is compared with the reference level for ABC comparison by the comparator 108.

In case of the arrangement of FIG. 1 in the first embodiment, ABC control is done so that the average level of the G signal before shading correction matches the reference level for ABC comparison. FIG. 5A shows this state. In FIG. 5A, the solid curve indicates the G output before shading correction, and the dotted line indicates the reference level for ABC comparison.

When the read signal shown in FIG. 5A is subjected to shading correction, the signal shown in FIG. 5B is obtained. In FIG. 5B, the solid curve indicates the average level of the G output after shading correction, and the dotted line indicates the reference level for ABC comparison. As a result of shading correction, an offset $\Delta$ is produced between the reference level for ABC comparison and the average level of the G signal after shading correction, as shown in FIG. 5B. Furthermore, since this offset component $\Delta$ is influenced by variations in shading nonuniformity, variations among image reading apparatuses are produced.

On the other hand, in case of the arrangement shown in FIG. 4 in this embodiment, since ABC control is done by comparing the G signal after shading correction by the shading correction circuit 402 with the reference level for ABC comparison by the comparator 108, the control is made to match the average level (solid curve) of the G output after shading correction with the reference level (dotted line) for ABC comparison, as shown in FIG. 5C. For this reason, a stable ABC control effect can be obtained without being influenced by variations in shading nonuniformity among image reading apparatuses.

The third embodiment of the present invention will be described below with reference to FIG. 6. FIG. 6 is a block diagram showing the arrangement of an image reading apparatus according to the third embodiment of the present invention, and the same reference numerals in FIG. 6 denote the same parts as those in FIG. 4 in the second embodiment described above.

In FIG. 6, the difference from FIG. 4 lies in that an L signal operation circuit 601 is added to the arrangement show in FIG. 4 to use an L signal obtained by the L signal operation circuit 601 from R, G, and B signals as the signal to be compared with the reference level for ABC comparison in place of the G signal.

This L signal is a luminance signal, which can be obtained by, e.g., a linear operation of A, B, and C:

$$L=\alpha_1 \cdot R + \alpha_2 \cdot G + \alpha_3 \cdot B \qquad (1)$$

Of course, the L signal may be calculated using operations other than equation (1) above.

When the L signal is used in ABC control, the ABC control can be realized in accordance with not a specific color (R, G, B, or the like) on the original but the luminance.

Figure 7:
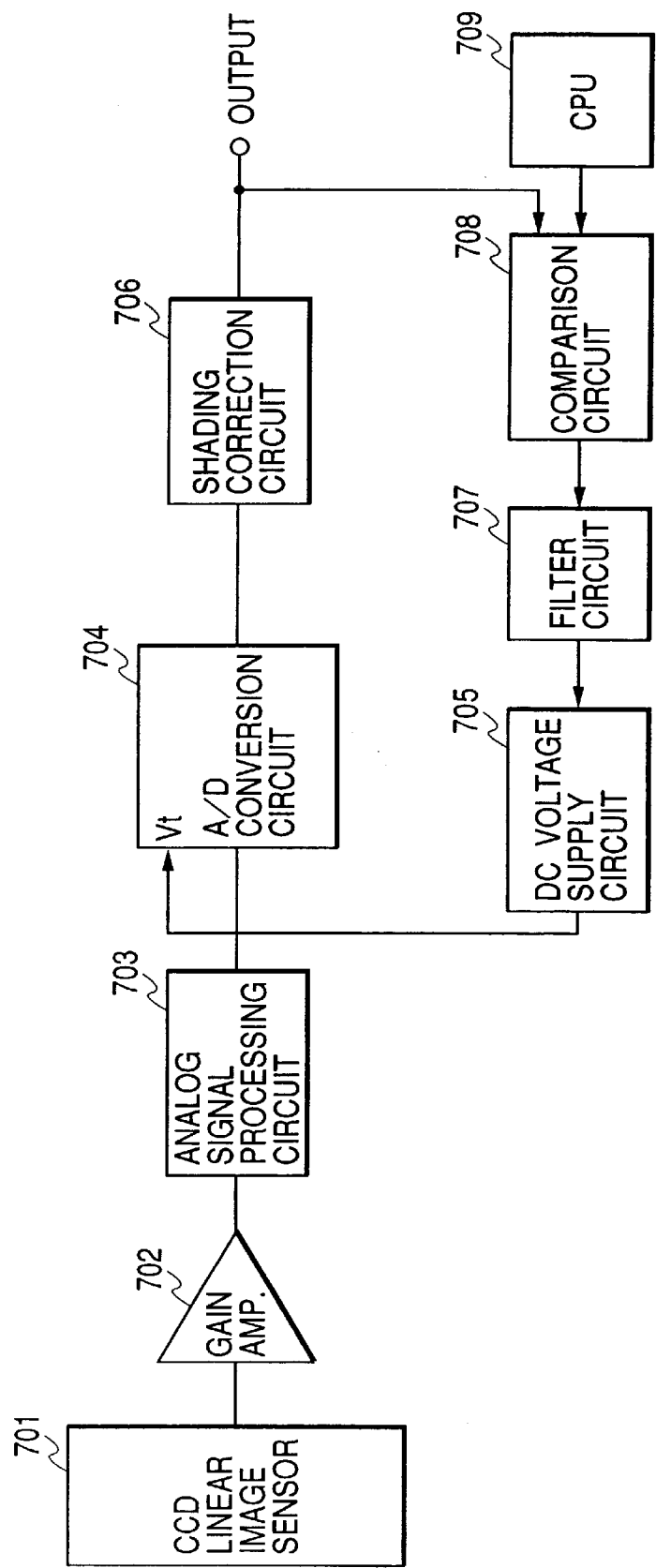
FIG. 7 is a block diagram showing the arrangement of an original background removal circuit in an image reading apparatus according to the fourth embodiment of the present invention.

The fourth embodiment of the present invention will be described below with reference to FIGS. 7 to 8, 9A and 9B. FIG. 7 is a block diagram showing the arrangement of an original background removal circuit in an image reading apparatus according to the fourth embodiment of the present invention. In FIG. 7, a CCD linear image sensor 701 converts an optical signal coming from an optical system into an electrical signal, and outputs it as an image signal. A gain amplifier 702 amplifies the signal output from the CCD linear image sensor 701 (an image sensor without discrimination of ODD and EVEN pixels, for the sake of simplicity) by a predetermined gain. An analog signal processing circuit 703 extracts an image signal component from the output signal from the gain amplifier 702. An A/D conversion circuit 704 converts an analog signal output from the analog signal processing circuit 703 into a digital signal. A DC voltage supply circuit 705 supplies a DC voltage. A shading correction circuit 706 performs shading correction for uniformly reading an original image. A filter circuit 707 such as a low-pass filter or the like removes (cuts) components in the high-frequency range (high-frequency components) of the output signal from a comparison circuit 708 (to be described below). The comparison circuit 708 compares the output from the shading correction circuit 706 and a predetermined value (normally, level 255) output from a CPU (Central Processing Unit; to be described below) 709. The CPU 709 controls the entire apparatus.

The voltage to be supplied from the DC voltage supply circuit 705 to an upper limit value Vt of a reference voltage of the A/D conversion circuit 704 is changed by the output from the filter circuit 707. When input data is smaller than the predetermined value, the comparison circuit 708 outputs the output from the shading correction circuit 706. Conversely, when input data is larger than the predetermined value, the circuit 708 outputs the predetermined value to the filter circuit 707.

The operation of the image reading apparatus according to this embodiment with the above arrangement will be described below using FIGS. 8, 9A and 9B together with FIG. 7.

Figure 8:
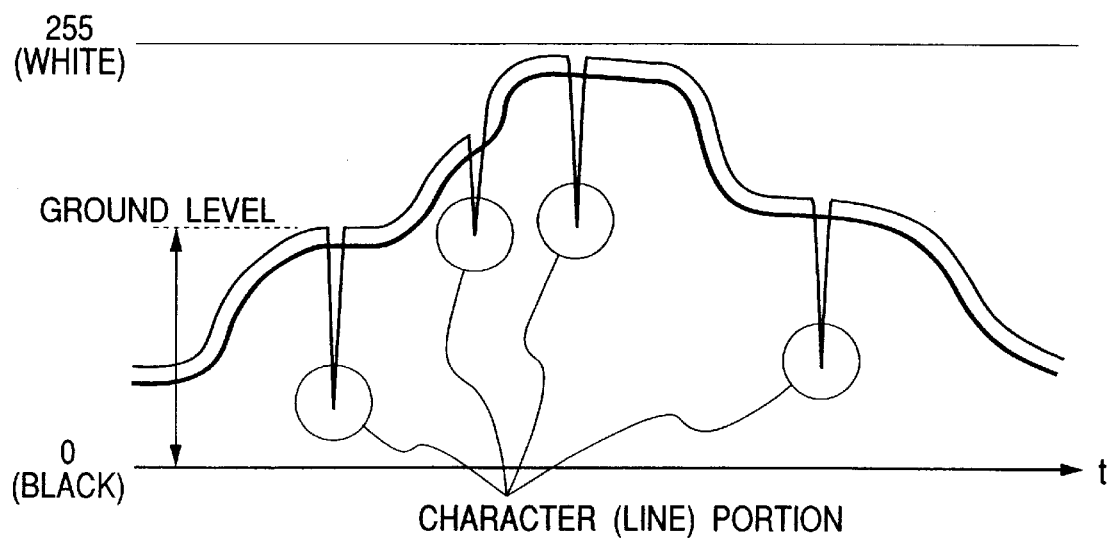
FIG. 8 is a graph showing the relationship between the Vt setup value for A/D and the shading-corrected output signal from the original background removal circuit in the image reading apparatus according to the fourth embodiment of the present invention.

FIG. 8 shows the output signal after shading correction by the shading correction circuit 706, and the reference voltage Vt to be set in the A/D conversion circuit 704. In FIG. 8, the lower horizontal line indicates black on the original, and the upper horizontal line indicates white on the original. Since the output from the shading correction circuit 706 is a digital signal, 8-bit data is used in this embodiment: level 0 in 8 bits indicates black and level 255 indicates white. The solid curve in FIG. 8 indicates the output signal output from the shading correction circuit 706, and the downward spikes on the solid curve indicate characters or lines on the original.

In FIG. 8, the background output level is initially low (close to black), becomes high (close to white) at the central portion, and returns low (close to black) again.

In FIG. 8, the bold solid curve indicates a level corresponding to the upper limit value Vt of the reference voltage of the A/D conversion circuit 704. This level is nearly equal to the background output level of the original indicated by the dotted line, but does not respond to abrupt changes in output signal level due to the presence of characters, lines, and the like via the filter circuit 707. The level indicated by the bold solid curve is input to the DC voltage supply circuit 705, which inputs a voltage corresponding to the input level to the Vt terminal of the A/D conversion circuit 704. When the level indicated by the bold solid curve is set at white level (level 255), an image on which characters, lines, and the like are easy to see since the background is removed is obtained as an image output.

Figure 9A:
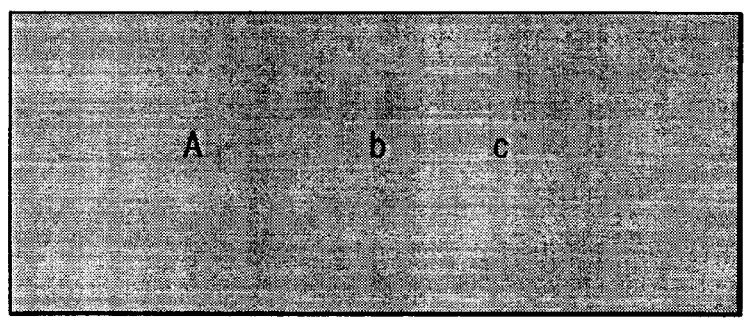
FIGS. 9A and 9B are views showing an original with a color background, and the output from the original background removal circuit in the image reading apparatus according to the fourth embodiment of the present invention.
Figure 9B:
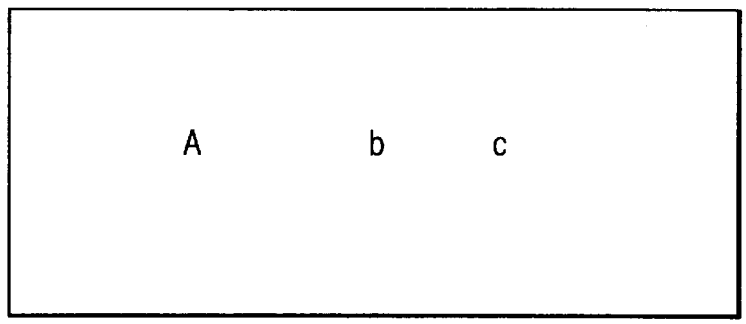

FIGS. 9A and 9B show an original with a color background, and an image output by this embodiment. That is, FIG. 9A shows an original, and FIG. 9B shows an output image. In order to actually set the dotted level at white level (level 255), the DC voltage supply circuit 705 changes the upper limit value Vt of the reference voltage of the A/D conversion circuit 704 in a direction to decrease.

In this embodiment, the output from the shading correction circuit 706 is fed back to the reference voltage Vt of the A/D conversion circuit 704. In principle, by feeding back the output signal (analog signal) from the CCD linear image sensor 701 or the output signal (digital signal) from the A/D conversion circuit 704, the same effect as in this embodiment can be obtained. However, when the analog signal is fed back, the circuit scale of, e.g., the comparison circuit and the like becomes larger than that in this embodiment, and such arrangement is not preferable in terms of a cost reduction and size reduction of the unit.

When the output from the A/D conversion circuit 704 is fed back, the circuit scale is the same as that of this embodiment. However, since this signal is the one before shading correction, if the light distribution is not uniform, the output background level drifts. Since the shading correction circuit multiplies coefficients using a point (target value), i.e., data before shading correction, as white level (255), data several levels lower than the target value before shading correction is set at white level (level 255) after shading correction. Hence, an image level that cannot be reproduced remains.

Figure 10:
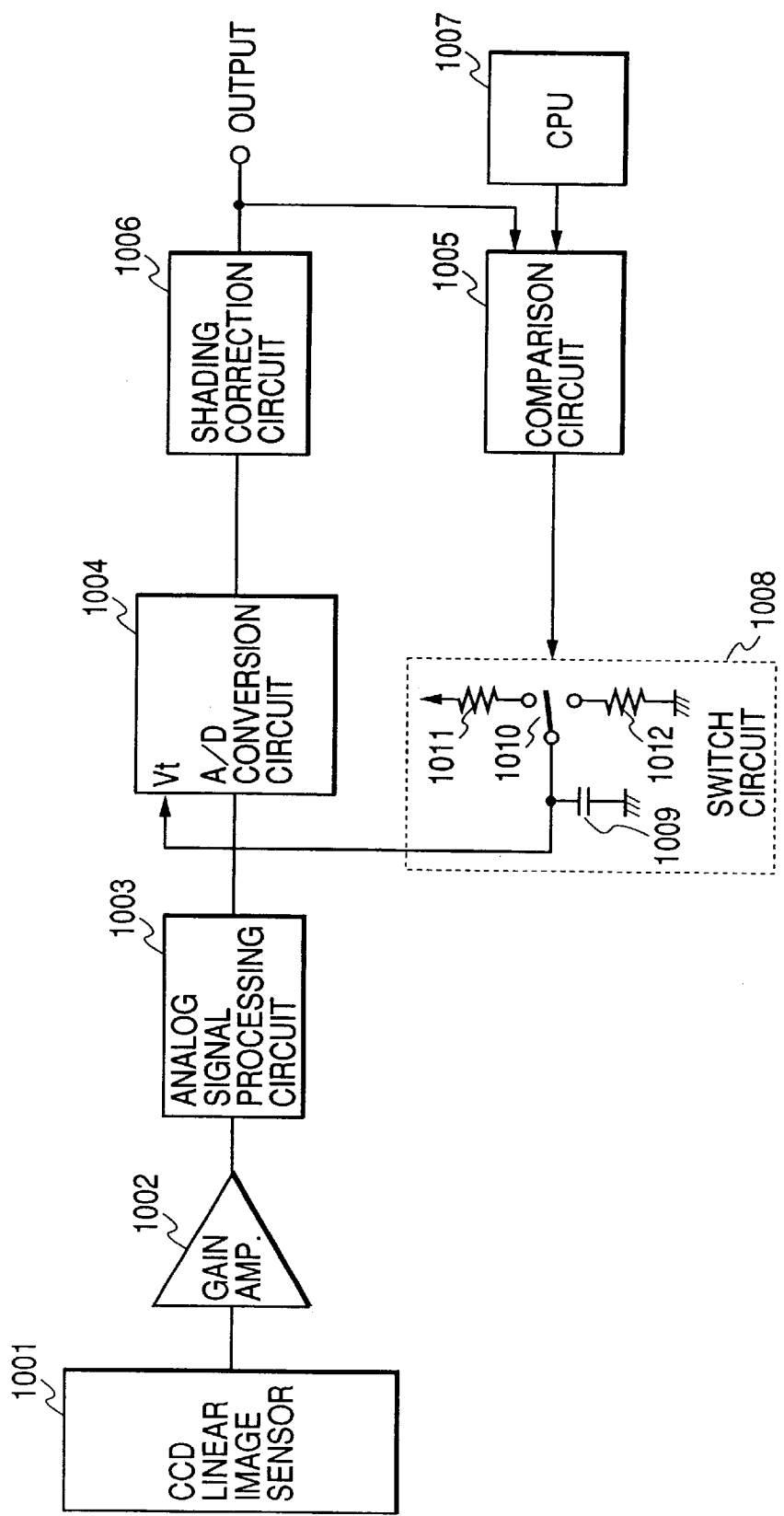
FIG. 10 is a block diagram showing the arrangement of an original background removal circuit in an image reading apparatus according to the fifth embodiment of the present invention.

The fifth embodiment of the present invention will be described below with reference to FIG. 10. FIG. 10 is a block diagram showing the arrangement of an original background removal circuit in an image reading apparatus according to the fifth embodiment of the present invention. In FIG. 10, a CCD linear image sensor 1001 converts an optical signal coming from an optical system into an electrical signal, and outputs it as an image signal. A gain amplifier 1002 amplifies the signal output from the CCD linear image sensor 1001 (an image sensor without discrimination of ODD and EVEN pixels, for the sake of simplicity) by a predetermined gain. An analog signal processing circuit 1003 extracts an image signal component from the output signal from the gain amplifier 1002. An A/D conversion circuit 1004 converts an analog signal output from the analog signal processing circuit 1003 into a digital signal. A comparison circuit 1005 compares the output from a shading correction circuit 1006 (to be described below) and a predetermined value (normally, level 255) output from a CPU (Central Processing Unit; to be described below) 1007. The shading correction circuit 1006 performs shading correction for uniformly reading an original image. The CPU 1007 controls the entire apparatus. A switch circuit 1008 has a switch 1010, capacitor 1009, and resistors 1011 and 1012. The common terminal of the switch 1010 is connected to ground (GND) via the capacitor 1009, and to an upper limit value Vt of a reference voltage of the A/D conversion circuit 1004. One terminal of the switch 1010 is connected to Vcc via one resistor 1011, and the other terminal thereof is connected to ground (GND) via the other resistor 1012.

The operation of the original background removal circuit in the image reading apparatus according to this embodiment with the above arrangement will be explained below.

In FIG. 10, the comparison circuit 1005 compares the output from the shading correction circuit 1006 with the predetermined value output from the CPU 1007. When the output from the shading correction circuit 1006 is smaller than the predetermined value, the switch 1010 is connected to the other resistor 1012 side to change the upper limit value Vt of the reference voltage of the A/D conversion circuit 1004 in a direction to decrease by discharging the charge on the capacitor 1009, thus raising the background level of the original (to approach level 255).

By contrast, when the output from the shading correction circuit 1006 is larger than the predetermined value, the switch 1010 is connected to one resistor 1011 side to change the upper limit value Vt of the reference voltage of the A/D conversion circuit 1004 in a direction to increase by injecting a charge on the capacitor 1009, thus lowering the background level of the original (away from level 255). With this control, the background level of the original approaches white level (level 255).

Assuming that the output from the shading correction circuit 1006 is larger than the predetermined value at the leading end portion of 1H data from the CCD linear image sensor 1001, the CPU 1007 sets the predetermined value to be output every 1H at level 0 so as to discharge a charge on the capacitor.

Figure 11:
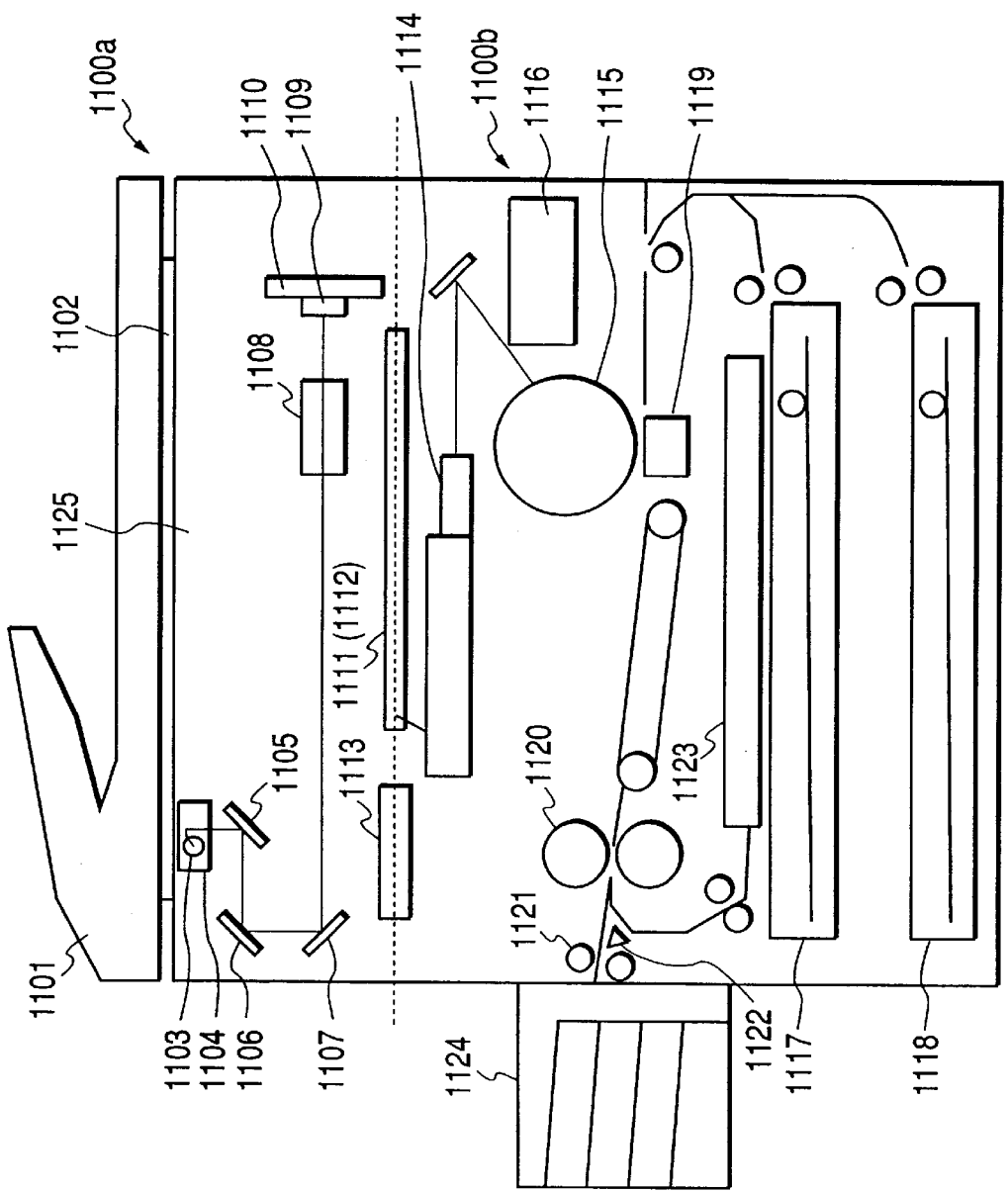
FIG. 11 is a longitudinal sectional view showing the arrangement of a copying machine as an image processing apparatus which comprises an image reading apparatus according to the sixth embodiment of the present invention.

The sixth embodiment of the present invention will be described below with reference to FIGS. 11 to 14. FIG. 11 is a longitudinal sectional view showing the arrangement of a copying machine as an image processing apparatus which comprises an image reading apparatus according to the sixth embodiment of the present invention. In FIG. 11, a document feeder 1101 of a reader module 1100a feeds originals (not shown) in turn from the last page onto a platen glass 1102, and exhausts the original on the platen glass 1102 to a predetermined portion after completion of original reading. When an original is fed onto the platen glass 1102, a lamp 1103 for original illumination is turned on, and a scanner unit 1104 begins to move, thus exposure-scanning the original. With this exposure scan, light reflected by the original is guided to an image sensor (to be referred to as a CCD hereinafter) 1109 via mirrors 1105, 1106, and 1107, and a lens 1108. The image of the exposure-scanned original is read by the CCD 1109. Image data output from the CCD 1109 is subjected to predetermined processing, and the processed data is transferred to a printer module 1100b.

A laser driver in the printer module 1100b drives a laser emission unit 1114 to emit a laser beam according to the image data output from the reader module 1100a. The laser beam is irradiated onto different positions on a photosensitive drum 1115 to form a latent image on the drum surface in accordance with the laser beam. A developer 1116 attaches a developing agent to the latent image portion on the photosensitive drum 1115. At a timing synchronous with the beginning of irradiation of the laser beam, a recording paper sheet is fed from one of cassettes 1117 and 1118, and is conveyed to a transfer unit 1119, thus transferring the developing agent that has become attached to the photosensitive drum 1115 onto the recording paper sheet.

The recording paper sheet on which the developing agent has been transferred is conveyed to a fixing unit 1120, and the developing agent is fixed onto the recording paper sheet by heat and pressure. The recording paper sheet which leaves the fixing unit 1120 is exhausted by exhaust rollers 1121. A sorter 1124 stores exhausted recording paper sheets in the respective bins, and sorts these recording paper sheets. When the sorter 1124 is not set in a sort mode, after the recording paper sheet is conveyed to the position of the exhaust rollers 1121, the direction of rotation of the exhaust rollers 1121 is reversed, and the recording paper sheet is guided by a flapper 1122 by a re-feed convey path 1123. When a multiple recording mode is set, the recording paper sheet is guided to the re-feed convey path 1123 by the flapper 1122 so as not to convey it to the exhaust rollers 1121. The recording paper sheet guided to the re-feed convey path 1123 is fed to the transfer unit 1119 at the same timing as that described above.

Image data output from the CCD 1109 is subjected to analog/digital conversion and shading correction in an analog/digital conversion·shading correction (A/D·SH) unit 1110. The image data processed by the A/D·SH unit 1110 is transferred to the printer module 1100*b* via an image processing unit 1111. A CPU 1112 controls the image processing unit 1111 in accordance with setup contents set at a console 1125. Such control program of the CPU 1112 is stored in a storage device 1113, and the CPU 1112 makes predetermined control with reference to the storage contents of this storage device 1113. The storage device 1113 is also used as a work area for the CPU 1112.

Figure 12:
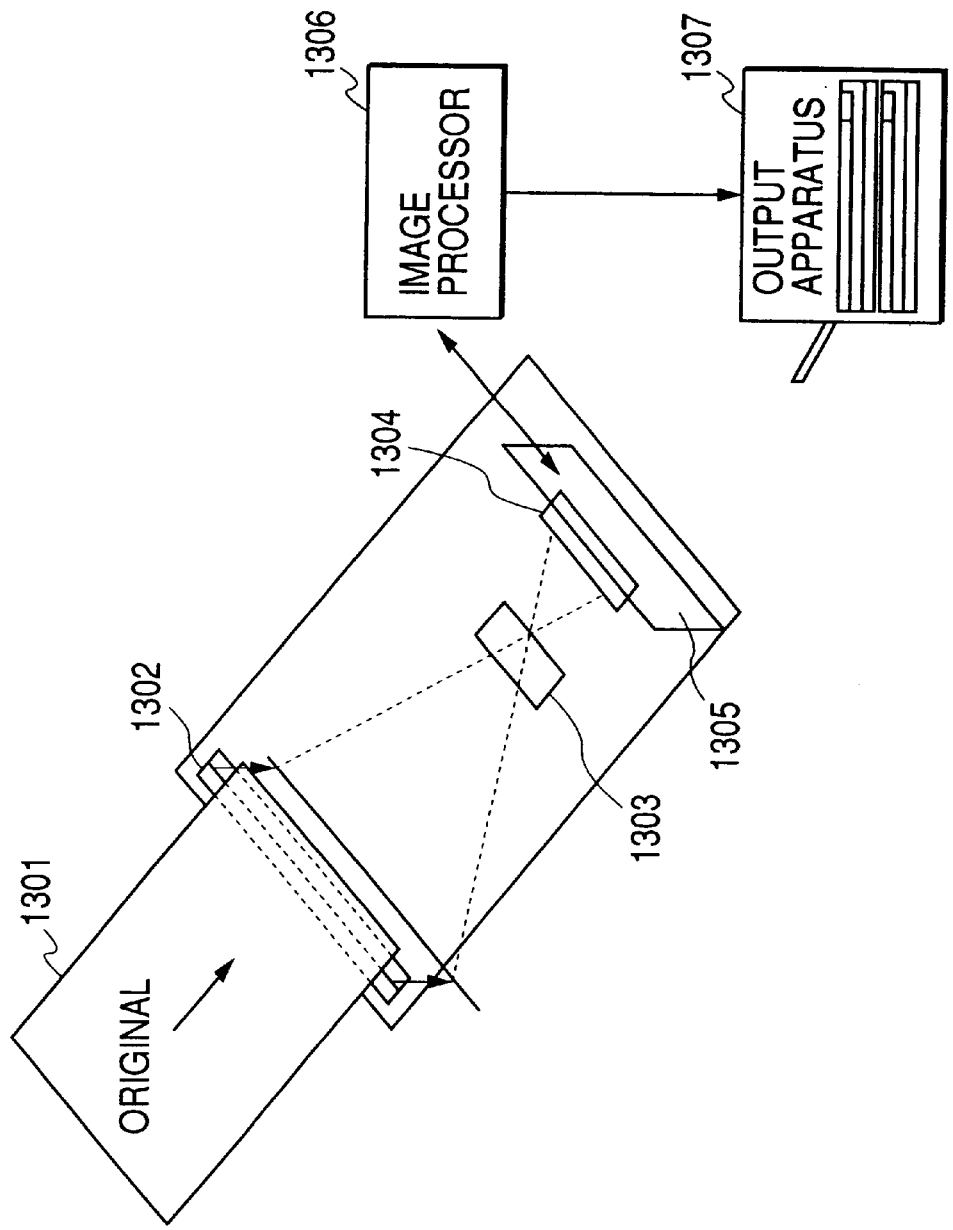
FIG. 12 is a view showing an example of original-fed reading in the image reading apparatus according to the sixth embodiment of the present invention.

FIG. 12 illustrates the original image reading method by the image reading apparatus according to this embodiment. Unlike in a conventional copying machine in which a movable optical system reads an original image set on a platen glass by full-scanning an original, the method of this embodiment reads the original image by conveying an original at a predetermined speed while the movable optical system is fixed in position. Original-fed reading has the following merit. That is, since original-fed reading does not require the time for returning the movable optical system as compared to full-scan reading, the number of originals to be read can be increased under sheet interval control of originals while the process speed remains the same.

In FIG. 12, an original 1301 to be fed and read is fed from a document feeder (not shown) at a predetermined speed. A reading unit 1302 as a normal movable optical system moves from the home position to a position beneath a platen glass on the side of a lens 1303, and is fixed in that position with its original illumination lamp ON until a job ends.

An image on the original 1301 that has been read by the reading unit 1302 is formed on a CCD 1304 via the lens 1303, and is converted into a video signal on a CCD processing board 1305. The video signal is subjected to image processing by an image processor 1306, and the processed video signal is output from an output apparatus 1307.

Original background removal that poses a problem in the present invention pre-scans an original and digitally corrects an original image on the basis of the histogram of image data obtained by the pre-scan upon reading the original in a conventional full scan. However, as described above, since original-fed reading cannot pre-scan the original, the same method as in the full scan cannot be used. To solve this problem, the present invention modifies original background removal by means of real-time control of the reference voltage of an A/D conversion circuit as a conventional method used in a facsimile apparatus or the like, in correspondence with each individual copying machine.

Figure 13:
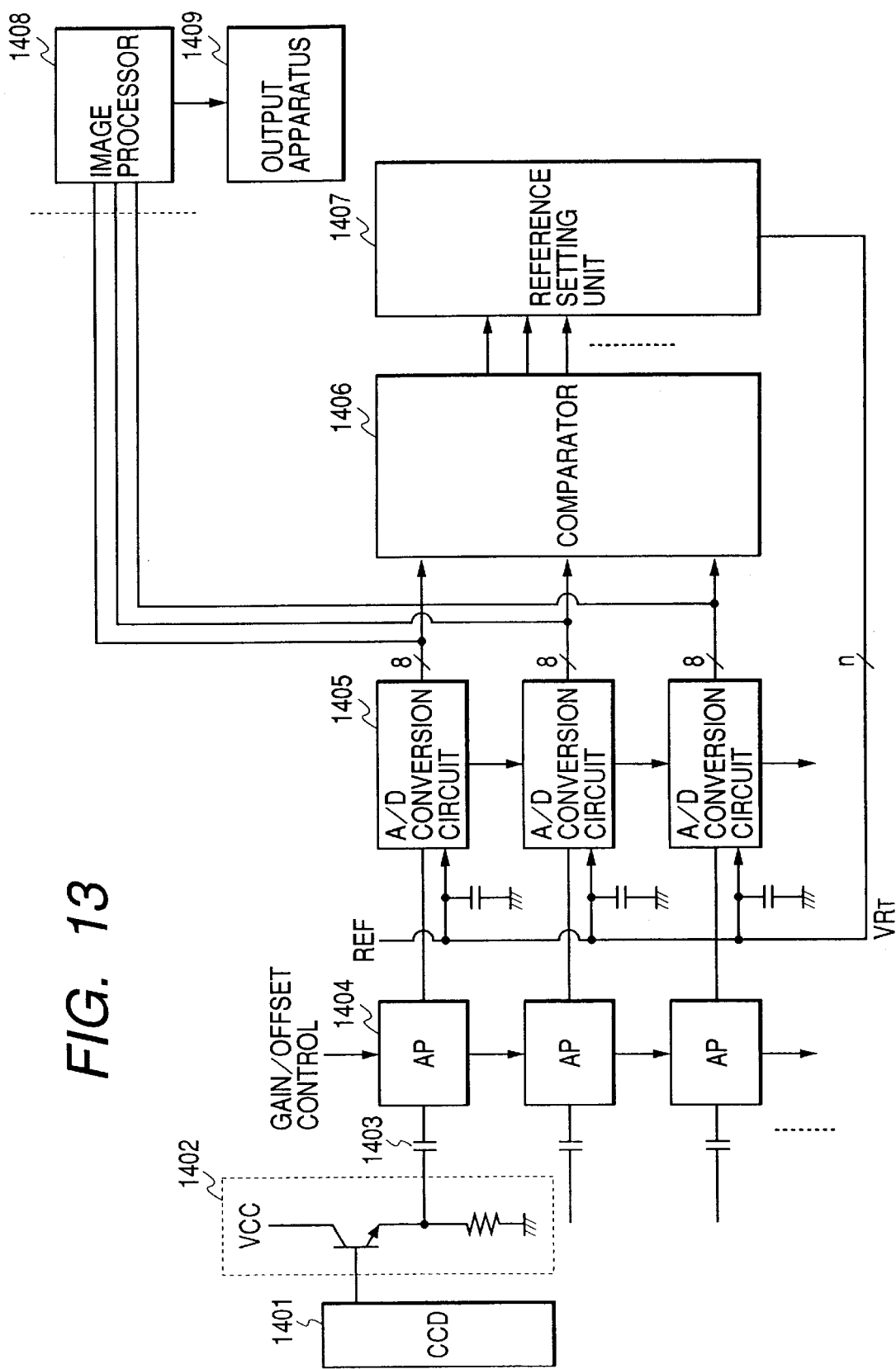
FIG. 13 is a block diagram showing the arrangement of the image reading apparatus according to the sixth embodiment of the present invention.

FIG. 13 is a block diagram showing the arrangement of an original background removal circuit in an image processing apparatus which comprises the image reading apparatus according to this embodiment. In FIG. 13, a CCD (charge coupled device) 1401 serves as a reading means, and its output signals are input to analog processors (AP) 1404 by coupling of capacitors 1403 via output circuits 1402. Each analog processor (AP) 1404 has a DC offset & gain adjustment function of adjusting the read signal to fall within the input range of an A/D conversion circuit 1405, and is adjusted by a control signal from an image processor 1408.

A digital signal output from each A/D conversion circuit 1405 is input in real time to a comparator 1406, and is also input to the image processor 1408 as an image signal to be subjected to image processing. After that the image signal is output from an output apparatus 1409.

Note that the difference between the present invention and the prior art lies in a reference setting unit 1407. An image processing apparatus processes at equal speed in accordance with the process speed of original reading, and a low-speed image processing system such as a facsimile apparatus or the like conventionally performs real-time AE for a scanner which has one A/D conversion circuit in correspondence with one CCD.

However, since an apparatus that reads and prints out an original image at high speed like in a copying machine requires high-speed digital signal processing, it becomes hard to use a one-to-one correspondence image processing system. For this reason, parallel processing is inevitable in image processing. To summarize in conventional real-time AE, signals obtained by reading the original to be fed and read are compared with a predetermined level (e.g., FFH of 8-bit data) by the comparator 1406 to sum up the luminance signals close to white, and the sum is fed back to VRT (reference) of the A/D conversion circuit 1405, thus adjusting the density of an original image. That is, the reference of the A/D conversion circuit 1405 apparently varies.

When the A/D conversion circuit 1405 keeps outputting FFH with reference to a predetermined reference voltage, this FFH data may exceed the dynamic range of the A/D input defined by the reference voltage as the input to the A/D conversion circuit 1405 and, hence, the objective of this invention is to cancel predetermined luminance data while assuring such dynamic range.

Figure 14:
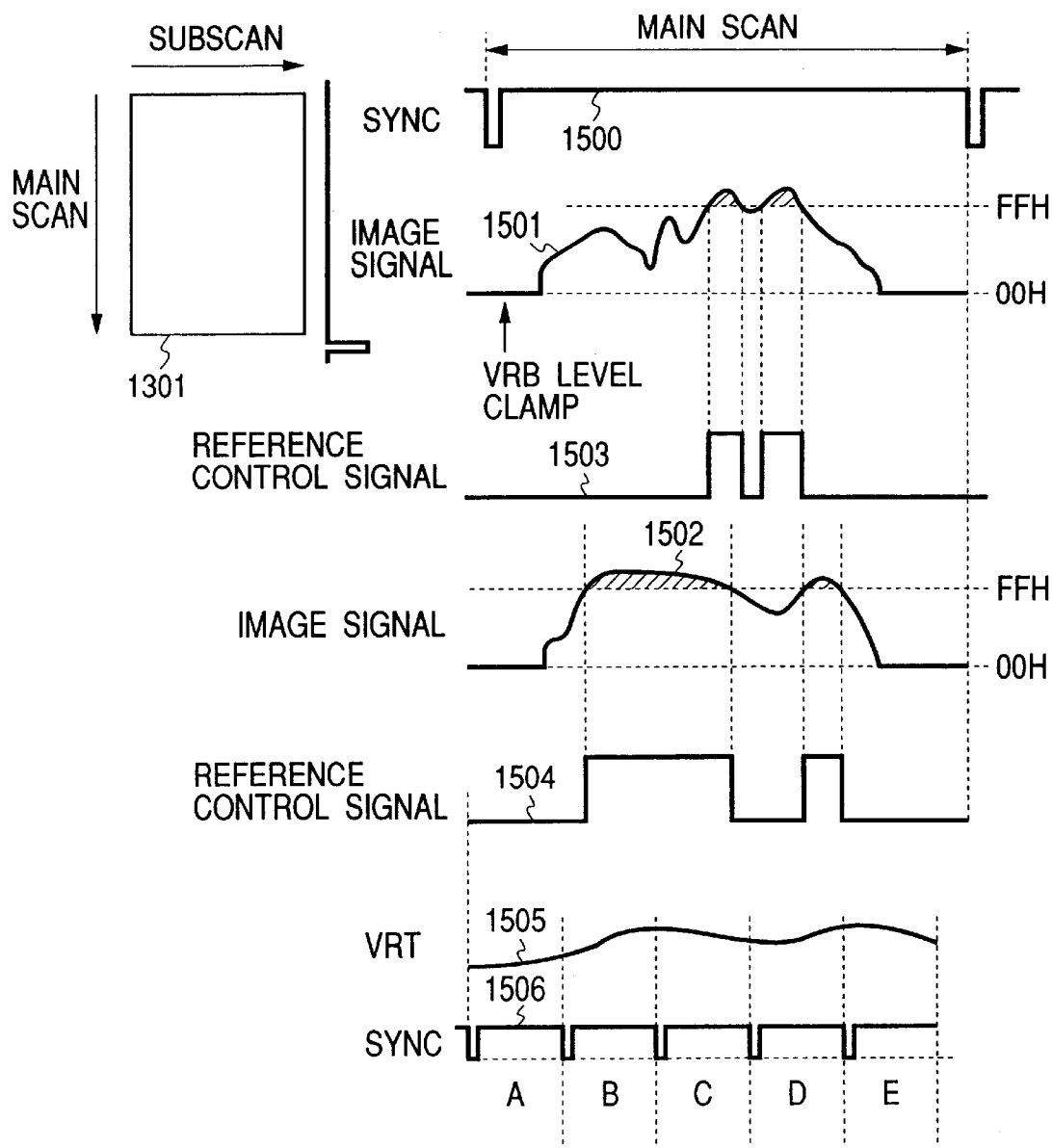
FIG. 14 is a chart for explaining real-time original background removal in the image reading apparatus according to the sixth embodiment of the present invention.

FIG. 14 summarizes the operation of the reading system. When an original is to be read actually, pixel data (image signals) 1501 and 1502 in the main scan direction have different levels in units of pixels in correspondence with the original. Upon adjusting the A/D reference, the VRT level is set at FFH of the read value, and data exceeding this level is uniformly set at FFH. Reference control signals 1503 and 1504 at that time have rectangular waveforms, as shown in FIG. 14, and are added to the reference control for their durations (H). With this operation, a reference voltage 1505 of the A/D conversion circuit constantly varies, as shown in FIG. 14. Since this operation does not control the level of the input signal to the A/D conversion circuit, if the reference voltage lowers, image data shifts toward the white side; if the reference voltage rises, image data relatively shifts toward the black side. The present invention controls such relationship upon original-fed reading, thus attaining real-time original background removal.

In FIG. 14, since the read data do not exceed FFH during periods C and E, free discharging is done. On the other hand, since data exceed FFH during periods A, B, and D, a charge is injected on the capacitor to vary the voltage VRT 1505.

However, as described above, when the signal processing speed becomes higher to meet high-speed requirements of apparatuses, two or four A/D conversion circuits must be parallelly driven for one CCD to attain a required processing speed. When a plurality of A/D conversion circuits are parallelly driven, variations of characteristics of the individual A/D conversion circuits and variations of reference voltages to be fed back pose a problem.

FIG. 13 in this embodiment shows a simple arrangement that can remove such variations. More specifically, the monitoring results of the output signals from the respective A/D conversion circuits 1405 are ANDed or ORed in the reference setting unit 1407 without being directly fed back to the individual A/D conversion circuits 1405, and the operation result in the unit 1407 is set as a common reference in all the A/D conversion circuits 1405. The reference setting unit has the same setting function as the aforementioned reference setting switching means, i.e., the individual setup function, and its reference setting function based on output data from the plurality of A/D conversion circuits 1405 can switch the look-up method of individual comparison results depending on the types of originals, i.e., a photograph original, character original, photograph/character original, and the like. Especially, a character original normally has a white or constant-density background, and nearly no variations of the reference voltage are needed. On the other hand, in a photograph original, since image data vary largely, if such results are fed back at high speed, the background of the original is adversely influenced by an output image. The present invention can remove such shortcomings.

As a most outstanding effect, the present invention can prevent a relative difference from being produced among original read data due to different reference voltages of the individual A/D conversion circuits 1405.

Figure 15:
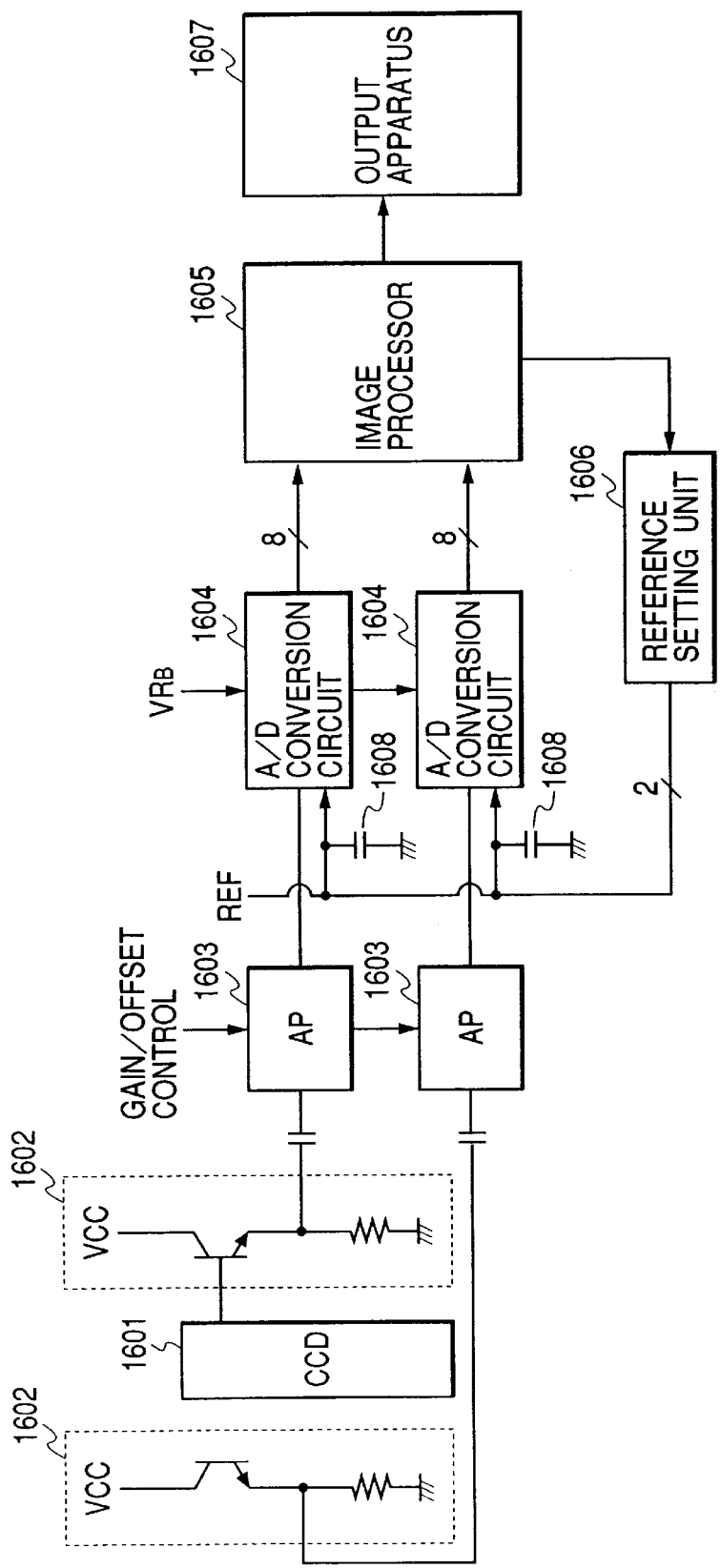
FIG. 15 is a block diagram showing the arrangement of an image reading apparatus according to the seventh embodiment of the present invention.

The seventh embodiment of the present invention will be described below with reference to FIG. 15. FIG. 15 is a block diagram showing the arrangement of an original background removal circuit in an image reading apparatus according to the seventh embodiment of the present invention. FIG. 15 shows a system including a scanner unit as an original reading unit independently of an image processing unit.

In FIG. 15, the system includes a CCD (charge coupled device) 1601 as a reading means, output circuits 1602, analog processors (AP) 1603, A/D conversion circuits 1604, an image processor 1605, a reference setting unit 1606, an output apparatus 1607, and capacitors 1608.

The output signals from the CCD 1601 are input to the analog processors (AP) 1603 by coupling of the capacitors 1608 via the output circuits 1602. Each analog processor (AP) 1603 has a DC offset & gain adjustment function of adjusting the read signal to fall within the input range of the A/D conversion circuit 1604, and is adjusted by a control signal from the image processor 1605.

A digital signal from each A/D conversion circuit 1604 is input as an image signal to the image processor 1605 to be subjected to image processing, and the processed signal is output from the output apparatus 1607. The output signal from the image processor 1605 is input to the reference setting unit 1606.

In the sixth embodiment mentioned above, all image data, which have been read by the CCD 1401 as a scanner unit and have reached a predetermined value as a result of checking by the comparison function, are fed back to A/D reference control. That is, a closed system is formed inside the scanner unit. For this reason, setups associated with image data are determined by operations before reading.

In this embodiment, image data read by the CCD 1601 as a scanner unit are directly input to the image processor 1605. Hence, control data for the background of an original are calculated while performing image processing, and adjustment data are fed back to the reference setting unit (e.g., the one having a voltage setting function based on a D/A conversion function) 1606. For this reason, reference voltage control can be done at higher speed than a closed system in the CCD 1601.

In this embodiment, the major difference from the sixth embodiment described above is that the reference voltage changes little by little in units of pixels in one main scan line upon reading an original in the sixth embodiment, while adjustment in units of main scan lines or a plurality of lines can be done in this embodiment.

Figure 16:
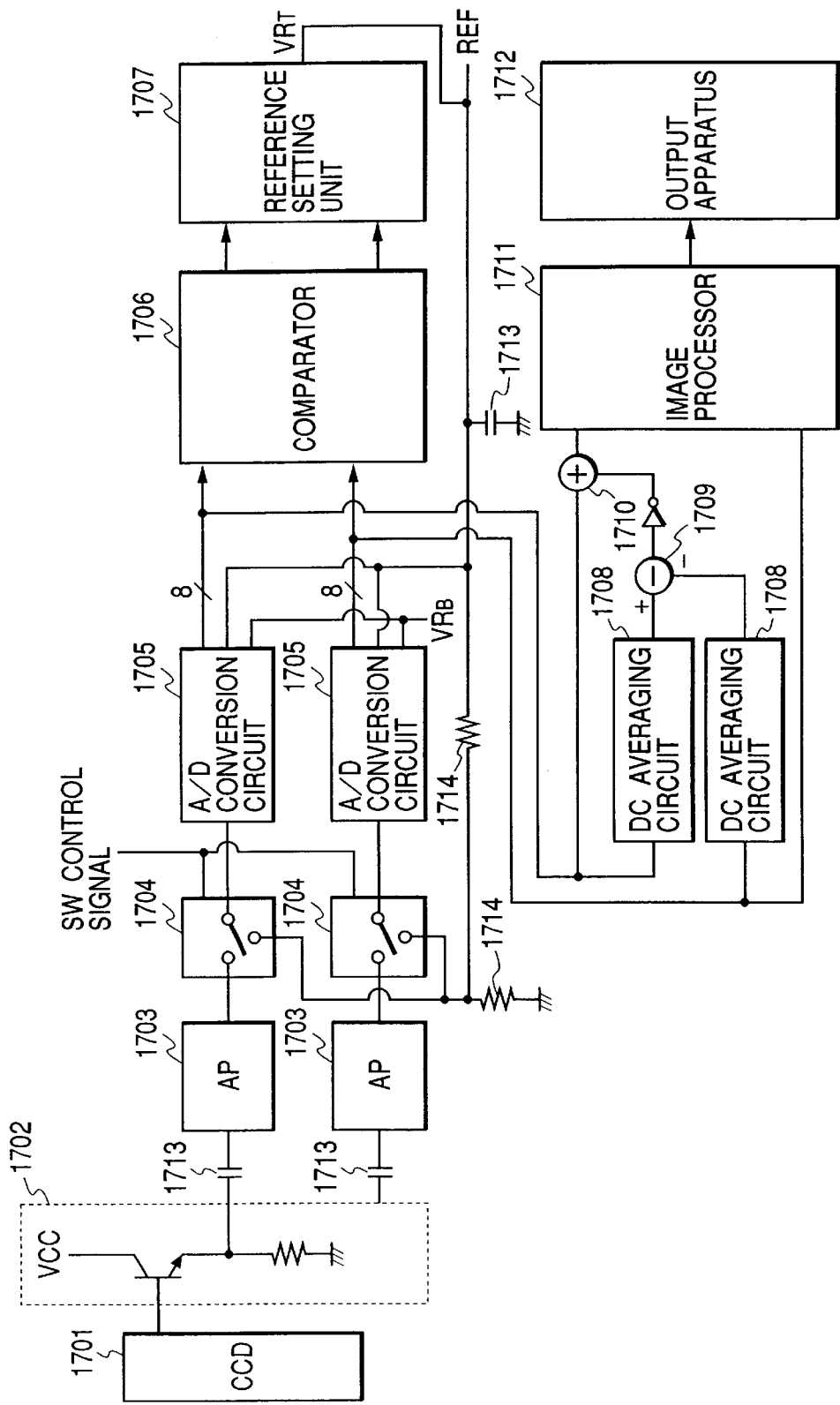
FIG. 16 is a block diagram showing the arrangement of an image reading apparatus according to the eighth embodiment of the present invention.
Figure 17:
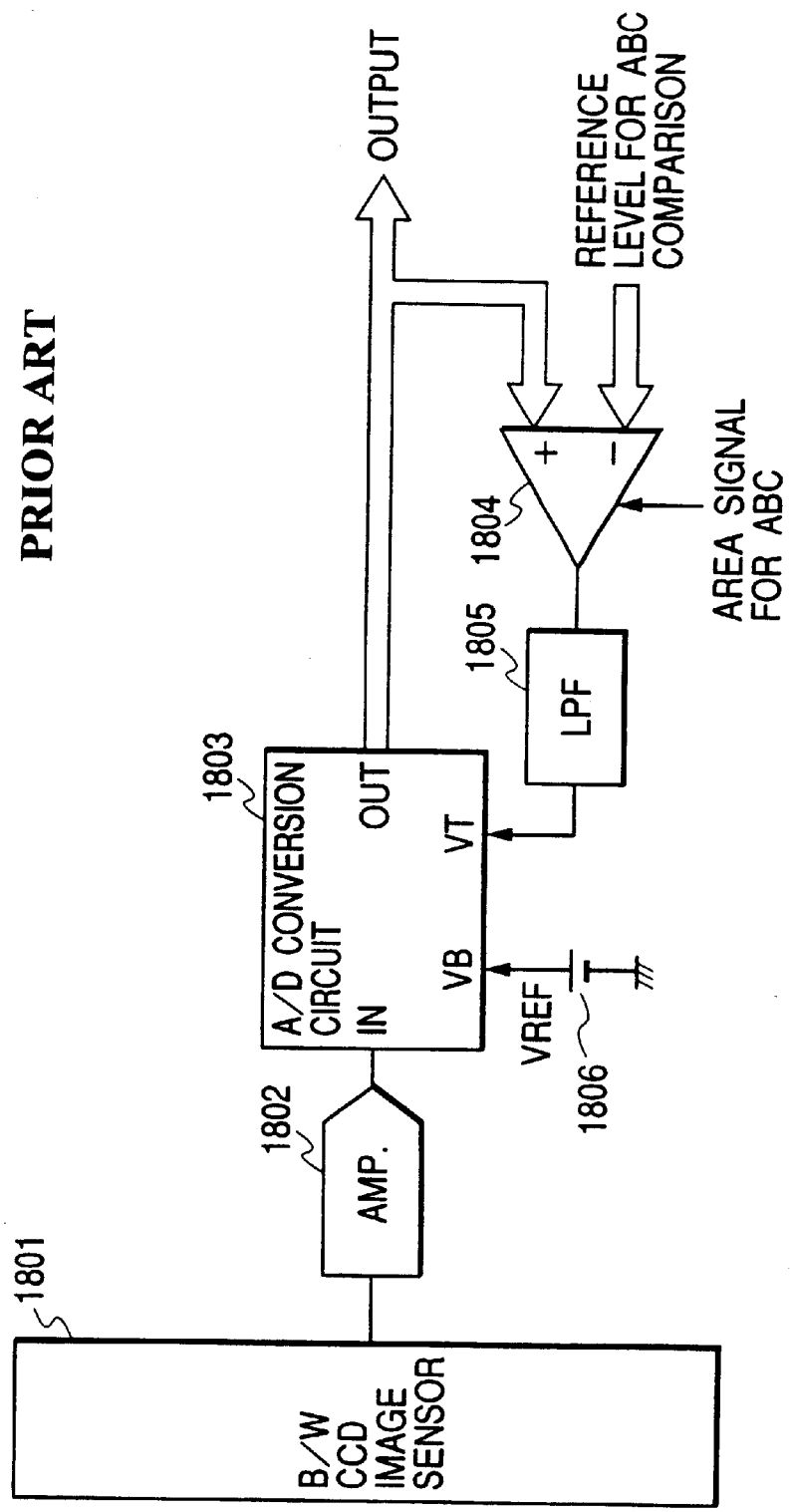
FIG. 17 is a block diagram showing the arrangement of an ABC circuit in a conventional image reading apparatus.
Figure 18:
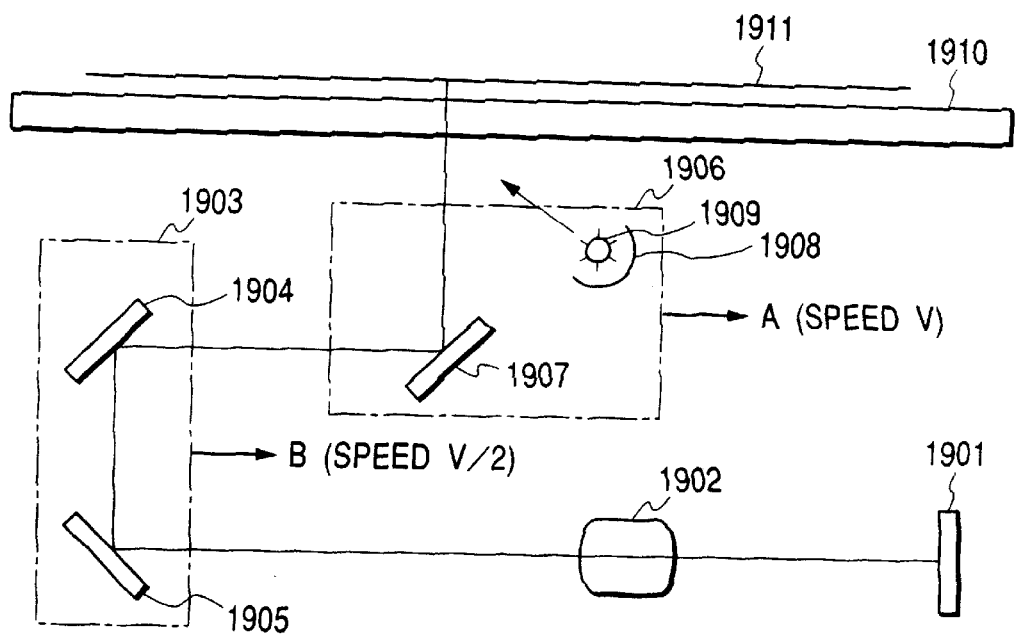
FIG. 18 is a view showing the arrangement of a conventional image reading apparatus different from that shown in FIG. 17.
Figure 19:
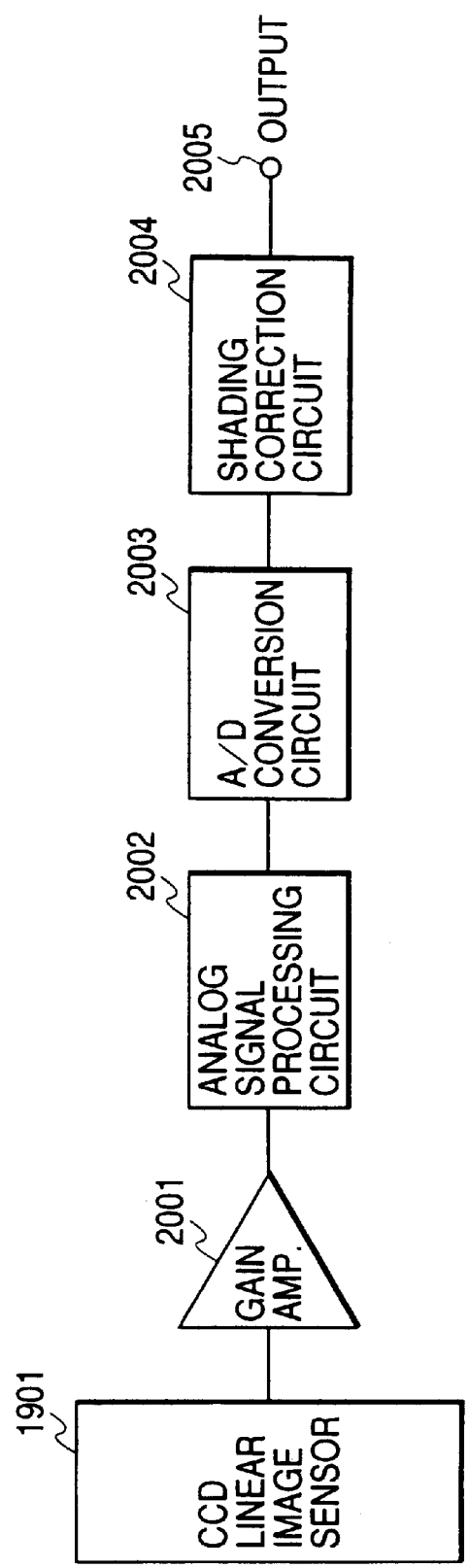
FIG. 19 is a block diagram showing an example of image signal processing in the conventional image reading apparatus shown in FIG. 18.

The eighth embodiment of the present invention will be described below with reference to FIG. 16. FIG. 16 is a block diagram showing the arrangement of an original background removal circuit in an image reading apparatus according to the eighth embodiment of the present invention. The apparatus shown in FIG. 16 comprises a CCD (charge coupled device) 1701 as a reading means, output circuits 1702, analog processors (AP) 1703, monitor selection switches 1704, A/D conversion circuits 1705, a comparator 1706, a reference setting unit 1707, DC averaging circuits 1708, a comparison circuit 1709, a data correction unit 1710, an image processor 1711, an output apparatus 1712, capacitors 1713, and resistors 1714.

In this embodiment, the monitor selection switches 1704, DC averaging circuits 1708, comparison circuit 1709, and data correction unit 1710 are added to the arrangement shown in FIG. 13 in the sixth embodiment.

The data correction unit 1710 digitally corrects variations of a plurality of A/D conversion circuits 1705. During a data period other than the image range the monitor selection switches 1704 generate reference voltages for the A/D conversion circuits 1705 based on a standard voltage, and the reference voltages are read by the A/D conversion circuits 1705. The average values of the read outputs are calculated by the DC averaging circuits 1708, and the difference between the average values is calculated by the comparison circuit 1709. After that, the data correction unit 1710 corrects data.

In FIG. 16, a system having no data correction unit 1710 serves as a reference side. A correction signal calculated by the data correction unit is effective for one period of a main scan signal, and the corrected value is calculated for each line. Such control can correct image data with higher precision resulting from control of the reference level of each A/D conversion circuit 1705.

As described above, even when ABC circuits are applied to the color image reading apparatus, since the VT values of A/D conversion circuits for the R, G, and B channels can be controlled as an identical value, a large difference can be prevented from being produced between the color tones of the read image and the original unlike in a case wherein the R, G, and B channels are independently controlled. Since a signal after shading correction is fed back to the ABC circuit, and the signal to be fed back uses a luminance signal obtained by a predetermined operation using R, G, and B values, variations in ABC control effects among apparatuses depending on shading nonuniformity can be reduced, and ABC control can be realized in accordance with not the color tone of an original but its brightness (luminance).

Also, when the original to be read has a color background or a background pattern and characters are written on such background, an image with clear characters and lines can be output.

Furthermore, the background removal effect of an original can be obtained and optimal image reading can be done by correcting data offsets traced back to reading means, even when original-fed reading, which disables background removal of an original to be attained by a full scan, is done at, especially, high speed.

Many widely different embodiment of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
an A/D converter adapted to convert a plurality of color signals output from an image sensor into a plurality of color digital signals; and
a control unit adapted to control a reference voltage of said A/D converter by comparing a predetermined one color of the plurality of color digital signals with a predetermined reference level.

2. An apparatus according to claim 1, further comprising:
a high-frequency component removing unit adapted to remove a high-frequency component from a comparison result,
wherein said control unit effects control so as to input an output of said high-frequency component removing unit to said A/D converter.

3. An image reading apparatus comprising:
an A/D converter adapted to convert a plurality of color signals output from an image sensor into a plurality of color digital signals;
a shading correction unit adapted to shade-correct the plurality of color digital signals; and
a control unit adapted to control a reference voltage of said A/D converter by comparing one color of the plurality of color digital signals shading-corrected by said shading correction unit with a predetermined reference level.

4. An apparatus according to claim 3, further comprising:
a high-frequency component removing unit adapted to remove a high-frequency component from a comparison result,
wherein said control unit effects control so as to input an output of said high-frequency component removing unit to said A/D converter.

5. An image reading apparatus comprising:
an A/D converter adapted to convert a plurality of color signals output from image sensor means into a plurality of color digital signals;
a shading correction unit adapted to shade-correct the plurality of digital signals;
an operation unit adapted to perform a predetermined operation for the plurality of color digital signals shading-corrected by said shading correction unit; and
a control unit adapted to control a reference voltage of said A/D converter by comparing the operation result of said operation unit with a predetermined reference level.

6. An apparatus according to claim 5, further comprising:
a high-frequency component removing unit adapted to remove a high-frequency component from a comparison result,
wherein said control unit effects control so as to input an output of said high-frequency component removing unit to said A/D converter.

7. An image reading apparatus comprising:
an A/D converter adapted to convert a signal output from an image sensor into a digital signal;
a shading correction unit adapted to shade-correct the digital signal; and
a control unit adapted to change an upper limit value of a reference voltage of said A/D conversion unit by comparing an output of said shading correction unit with a predetermined reference level.

8. An apparatus according to claim 7, wherein said control unit changes the upper limit value of the reference voltage of said A/D converter by switching a switch circuit on the basis of the comparison result.

9. An apparatus according to claim 8, wherein the switch circuit comprises a capacitor and resistor, and the upper limit value of the reference voltage of said A/D converter is changed by charging/discharging of the capacitor and resistor.

10. An image reading method comprising:
an A/D conversion step of converting a plurality of color signals output from an image sensor into a plurality of color digital signals by A/D conversion; and
a control step of controlling a reference voltage of said A/D conversion step by comparing a predetermined one color of the plurality of color digital signals with a predetermined reference level.

11. A method according to claim 10, further comprising:
a high-frequency component removing step of removing a high-frequency component from a comparison result,
wherein said control step effects control so as to input an output of said high-frequency component removing step to said A/D conversion step.

12. An image reading method comprising:
an A/D conversion step of converting a plurality of color signals output from an image sensor into a plurality of color digital signals by A/D conversion;
a shading correction step of shading-correcting the plurality of digital signals A/D-converted by said A/D conversion step;
a control step of controlling a reference voltage of said A/D conversion step by comparing one color of the plurality of color digital signals shading-corrected by said shading correction step with a predetermined reference level.

13. A method according to claim 12, further comprising:
a high-frequency component removing step of removing a high-frequency component from a comparison result,
wherein said control step effects control so as to input an output of said high-frequency component removing step to said A/D conversion step.

14. An image reading method comprising:
an A/D conversion step of converting a plurality of color signals output from an image sensor into a plurality of color digital signals;
a shading-correcting step of shading-correcting the plurality of digital signals;
an operation step of performing a predetermined operation for the plurality of color digital signals shading-corrected by said shading-correction step; and
a control step of controlling a reference voltage of said A/D conversion step by comparing the operation result with a predetermined reference level.

15. A method according to claim 14, further comprising:
a high-frequency component removing step of removing a high-frequency component from a comparison result, wherein said control step effects control so as to input an output of said high-frequency component removing step to said A/D conversion step.

16. An image reading method comprising:

an A/D conversion step of converting a signal output from an image sensor into a digital signal;

a shaping-correction step of shading-correcting the digital signal;

a control step of changing an upper limit value of a reference voltage of said A/D conversion step by comparing an output of said shading-correction step with a predetermined reference level.

17. A method according to claim 16, wherein the control step includes a step of changing the upper limit value of the reference voltage of said A/D conversion step by switching a switch circuit on the basis of the comparison result.

18. A method according to claim 17, wherein the switch circuit comprises a capacitor and resistor, and the upper limit value of the reference voltage of said A/D conversion step is changed by charging/discharging of the capacitor and resistor.

* * * * *

UNITED STATES PATENT AND TRADEMARK OFFICE
CERTIFICATE OF CORRECTION

PATENT NO. : 6,225,934 B1
DATED : May 1, 2001
INVENTOR(S) : Kazuhito Ohashi et al.

It is certified that error appears in the above-identified patent and that said Letters Patent is hereby corrected as shown below:

Column 6,
Line 37, "two-input" should read -- two input --; and
Line 59, "area]," should read -- area, --.

Column 7,
Line 64, "show" should read -- shown --.

Column 15,
Line 5, "embodiment" should read -- embodiments --.

Column 16,
Line 60, "shading-correction" should read -- shading-correcting --.

Column 17,
Line 7, "shaping-correction" should read -- shading-correction --.

Signed and Sealed this

Fifth Day of March, 2002

Attest:

JAMES E. ROGAN
*Attesting Officer*     *Director of the United States Patent and Trademark Office*